(12) United States Patent
Solheid et al.

(10) Patent No.: US 8,238,709 B2
(45) Date of Patent: Aug. 7, 2012

(54) MULTI-CONFIGURATION MOUNTING SYSTEM FOR FIBER DISTRIBUTION HUB

(75) Inventors: James J. Solheid, Lakeville, MN (US); Matthew Holmberg, Le Center, MN (US); Nick Maaske, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 751 days.

(21) Appl. No.: 12/338,586

(22) Filed: Dec. 18, 2008
(Under 37 CFR 1.47)

(65) Prior Publication Data
US 2009/0263097 A1    Oct. 22, 2009

Related U.S. Application Data

(60) Provisional application No. 61/014,647, filed on Dec. 18, 2007.

(51) Int. Cl.
G02B 6/00    (2006.01)
(52) U.S. Cl. .................. 385/137; 385/134; 385/139
(58) Field of Classification Search .............. 385/53–56, 385/59, 134, 135, 137, 139
See application file for complete search history.

(56) References Cited

U.S. PATENT DOCUMENTS

| | | | |
|---|---|---|---|
| 5,717,810 A | 2/1998 | Wheeler |
| 5,734,774 A | 3/1998 | Morrell |
| 6,160,946 A | 12/2000 | Thompson et al. |
| 6,383,034 B1 | 5/2002 | Blake et al. |
| 6,535,682 B1 | 3/2003 | Puetz et al. |
| 6,556,763 B1 | 4/2003 | Puetz et al. |
| 6,621,975 B2 | 9/2003 | Laporte et al. |
| 6,715,719 B2 | 4/2004 | Nault et al. |
| 6,760,531 B1 | 7/2004 | Solheid et al. |
| 6,788,786 B1 | 9/2004 | Kessler et al. |
| 6,792,190 B2 | 9/2004 | Xin et al. |
| 6,909,833 B2 | 6/2005 | Henschel et al. |
| 6,920,213 B2 | 7/2005 | Pershan |
| 6,920,274 B2 | 7/2005 | Rapp et al. |
| 6,980,725 B1 | 12/2005 | Swieconek |
| 6,983,095 B2 | 1/2006 | Reagan et al. |
| 7,086,539 B2 | 8/2006 | Knudsen et al. |
| 7,088,899 B2 | 8/2006 | Reagan et al. |
| 7,103,255 B2 | 9/2006 | Reagan et al. |
| 7,139,461 B2 | 11/2006 | Puetz et al. |
| 7,142,764 B2 | 11/2006 | Allen et al. |
| 7,146,089 B2 | 12/2006 | Reagan et al. |
| 7,149,398 B2 | 12/2006 | Solheid et al. |
| 7,171,102 B2 | 1/2007 | Reagan et al. |
| 7,194,181 B2 | 3/2007 | Holmberg et al. |
| 7,198,409 B2 | 4/2007 | Smith et al. |

(Continued)

OTHER PUBLICATIONS

Fiber Distribution Hub ACE-102V Pole-Mount Cabinet Installation Instructions, ADCP-96-008, Issue 2, ADC Telecommunications, Inc., pp. 1-31 (Dec. 2004).

(Continued)

*Primary Examiner* — Charlie Peng
*Assistant Examiner* — Mary El Shammaa
(74) *Attorney, Agent, or Firm* — Merchant & Gould P.C.

(57) ABSTRACT

A fiber distribution hub (FDH) includes an enclosure and brackets with provisions to be mountable in multiple configurations. More particularly, the FDH is mountable in multiple configurations to a pole. The brackets are rearrangeable to provide the mounting configuration with either a short or extended offset between an FDH cabinet and the pole.

18 Claims, 31 Drawing Sheets

U.S. PATENT DOCUMENTS

| | | |
|---|---|---|
| 7,200,317 B2 * | 4/2007 | Reagan et al. ............... 385/139 |
| 7,218,827 B2 | 5/2007 | Vongseng et al. |
| 7,233,731 B2 | 6/2007 | Solheid et al. |
| 7,245,809 B1 | 7/2007 | Gniadek et al. |
| 7,277,620 B2 | 10/2007 | Vongseng et al. |
| 7,298,952 B2 | 11/2007 | Allen et al. |
| 7,333,707 B2 | 2/2008 | Puetz et al. |
| 7,346,254 B2 | 3/2008 | Kramer et al. |
| 7,369,741 B2 | 5/2008 | Reagan et al. |
| 7,376,322 B2 | 5/2008 | Zimmel et al. |
| 7,376,323 B2 | 5/2008 | Zimmel |
| 7,400,813 B2 | 7/2008 | Zimmel |
| 7,407,330 B2 | 8/2008 | Smith et al. |
| 7,416,349 B2 | 8/2008 | Kramer |
| 7,418,181 B2 | 8/2008 | Zimmel et al. |
| 7,419,384 B2 | 9/2008 | Neumetzler et al. |
| 7,457,503 B2 | 11/2008 | Solheid et al. |
| 7,492,575 B2 | 2/2009 | Irmer et al. |
| 7,515,805 B2 | 4/2009 | Vongseng et al. |
| 7,519,259 B2 | 4/2009 | Smith et al. |
| 2006/0008231 A1 | 1/2006 | Reagan et al. |
| 2006/0269207 A1 * | 11/2006 | Ivancevic ............... 385/135 |
| 2007/0033629 A1 | 2/2007 | McGranahan et al. |
| 2007/0165995 A1 | 7/2007 | Reagan et al. |
| 2007/0189691 A1 | 8/2007 | Barth et al. |
| 2007/0192817 A1 | 8/2007 | Landry et al. |
| 2008/0008436 A1 | 1/2008 | Reagan et al. |
| 2008/0031585 A1 | 2/2008 | Solheid et al. |
| 2008/0042535 A1 | 2/2008 | Guzzo et al. |
| 2008/0042536 A1 | 2/2008 | Guzzo et al. |
| 2008/0079341 A1 | 4/2008 | Anderson et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0080829 A1 | 4/2008 | Smith et al. |
| 2008/0317425 A1 | 12/2008 | Smith et al. |
| 2009/0022467 A1 | 1/2009 | Puetz et al. |
| 2009/0074372 A1 | 3/2009 | Solheid et al. |
| 2009/0087157 A1 | 4/2009 | Smith et al. |
| 2009/0190896 A1 | 7/2009 | Smith et al. |
| 2009/0196565 A1 | 8/2009 | Vongseng et al. |

OTHER PUBLICATIONS

OmniReach™ FONS Fiber Distribution Hub Pole-Mount Kit Installation Instructions, ADCP-96-116, Issue 3, ADC Telecommunications, Inc., pp. 1-11 (Dec. 2006).

Pole Mounting Kits for the 4300 6U Outdoor Cabinet Installation Instructions, Document No. 4300-A2-ZZ49-00, Zhone Technologies, Inc., pp. 1-8 (Nov. 2005).

U.S. Appl. No. 12/276,005, filed Nov. 21, 2008 entitled "Fiber Distribution Hub With Multiple Configurations".

* cited by examiner

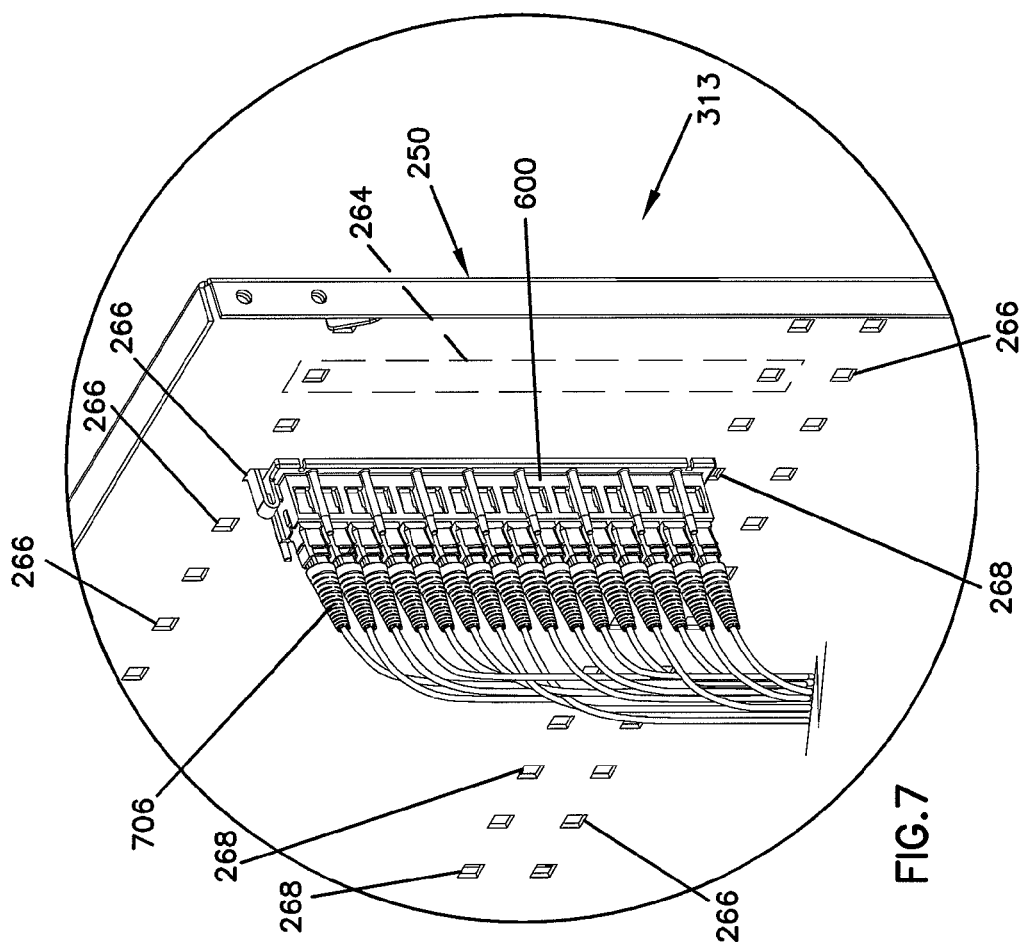
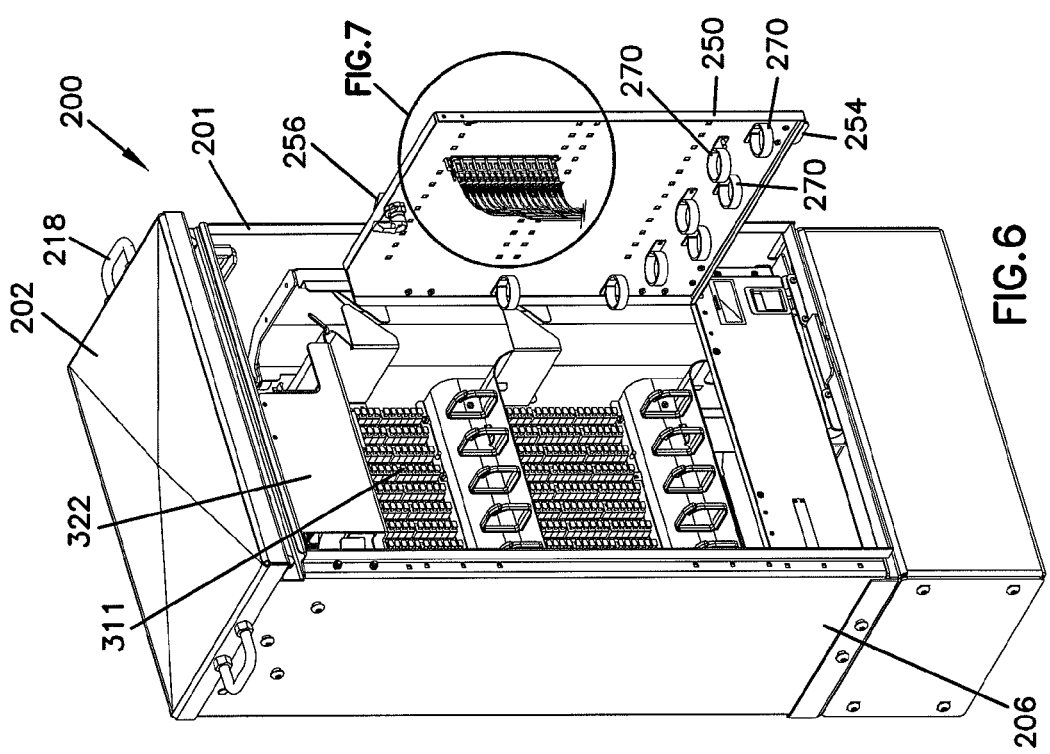

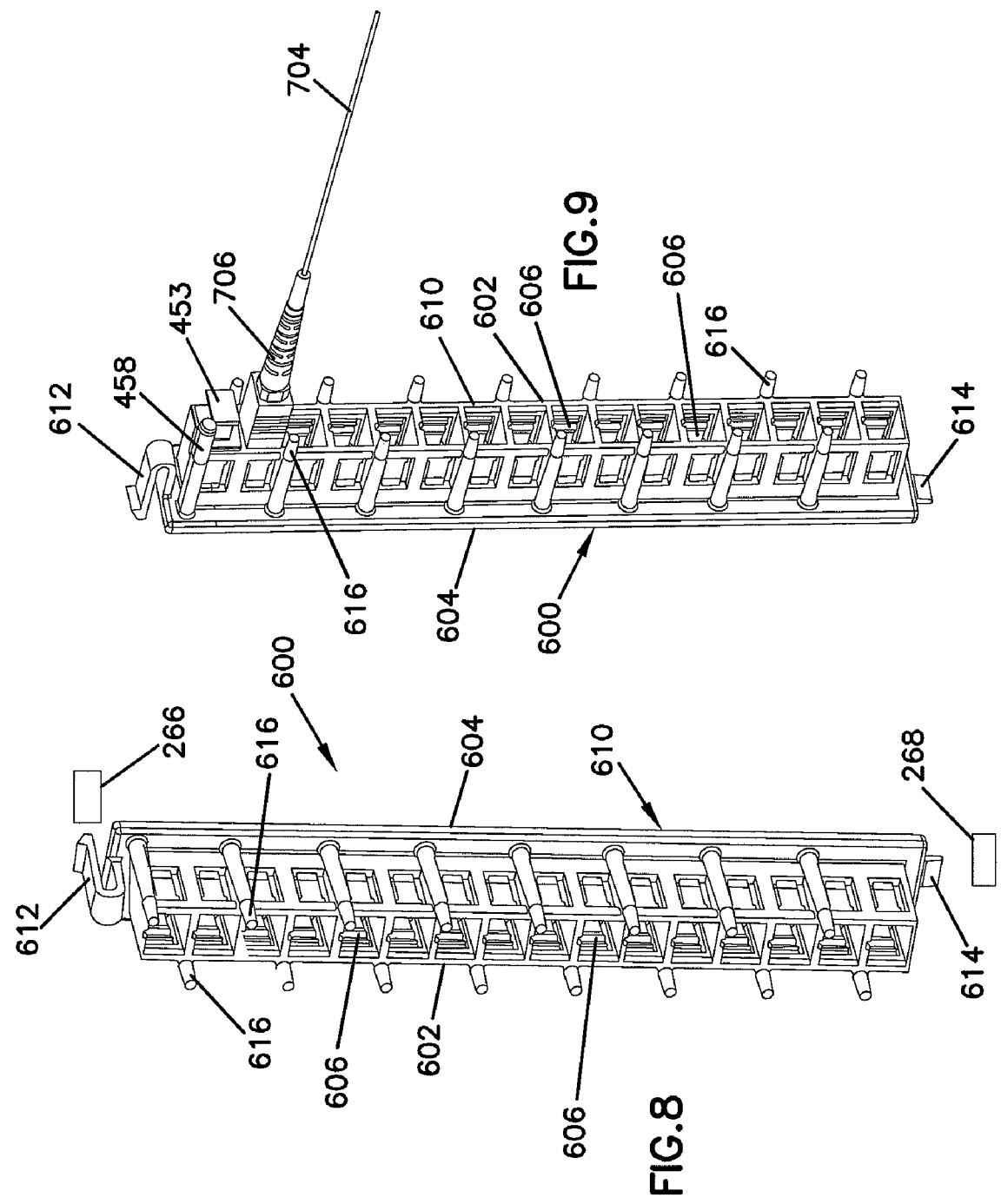

MULTI-CONFIGURATION MOUNTING SYSTEM FOR FIBER DISTRIBUTION HUB

CROSS REFERENCE TO RELATED APPLICATION

The present application claims the benefit of U.S. Provisional Patent Application Ser. No. 61/014,647, filed Dec. 18, 2007, which is hereby incorporated by reference in its entirety.

TECHNICAL FIELD

The principles disclosed herein relate to fiber optic cable and other cable distribution systems. More particularly, the present disclosure relates to distributing fiber optic cables and related signals within a network including provisions to reroute, add capacity to, and reduce capacity of the network.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown at FIG. 1, the network 100 may include a central office 110 that connects a number of end subscribers 115 (also called end users 115 herein) within the network 100. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network 100 can be aerial or housed within underground conduits (e.g., see conduit 105).

A portion of the network 100 that is closest to the central office 110 is generally referred to as an F1 region, where F1 is the "feeder fiber" from the central office 110. The F1 portion of the network 100 may include a distribution cable having on the order of 12 to 48 fibers; however, alternative implementations may include fewer or more fibers. A portion of the network 100 that includes at least one of the FDHs 130 and at least one of the end users 115 may be referred to as an F2 portion of the network 100. Splitters used in the typical FDH 130 may split incoming fibers of a feeder cable into, for example, 216 to 432 individual distribution fibers that may be associated with a like number of end user 115 locations.

Referring to FIG. 1, the network 100 includes a plurality of break-out locations 125 at which branch cables 122 are separated out from main cable lines 120. The break-out locations 125 can also be referred to as tap locations, drop cable locations, splice locations or branch locations. The branch cables 122 can also be referred to as drop cables, drop lines, break-out cables or stub cables. The branch cables 122 are often connected to drop terminals 104 that include connector interfaces for facilitating coupling the fibers of the branch cables 122 to a plurality of different subscriber locations 115. The branch cables 122 are also often connected to FDHs 130.

Within the FDH 130, incoming optical fibers, from the central office 110, can be connected to outgoing optical fibers, leading to the end users 115, forming an optical signal connection. Each of the incoming optical fibers may be split into multiple intermediate fibers. Each of these intermediate fibers may also be connected to one of the outgoing optical fibers, forming an optical signal connection. The optical signal connections can be reconfigured within the FDH 130. For example, a particular incoming fiber may be initially connected to a first outgoing fiber but may be disconnected and instead connected to a second outgoing fiber. Certain unused incoming fibers and/or intermediate fibers may not be connected to any of the outgoing fibers. There is a need for an FDH that provides organization and storage for incoming and intermediate fibers that is adaptable to multiple configurations, the configuration being selected based on the intended application. The FDH 130 may be mounted in various applications and locations. There is a need for the mounting of the FDH 130 to be adaptable to conveniently match various applications and locations. The present disclosure satisfies these and other needs.

SUMMARY

Certain aspects of the disclosure relate to fiber optic cable systems.

In example systems, a fiber optic distribution system includes one or more fiber distribution hubs (FDHs) that provide an interface between a central office and subscribers. The FDH contains terminated incoming fibers, coming from the central office, and terminated outgoing fibers, each going to one of the subscribers. The terminated outgoing fibers may be collected at a termination region within the FDH. One or more of the incoming fibers may be connected to an optical splitter within the FDH thereby coupling the incoming fiber to multiple intermediate fibers (e.g., connectorized pigtails). The incoming fibers and intermediate fibers may selectively be connected to the outgoing fibers within the FDH. One or more of the incoming fibers and/or the intermediate fibers may not be connected to any of the outgoing fibers but may instead be parked at a storage module.

The FDHs may be mounted in a variety of different locations and in a variety of different applications. A common FDH mounting location is overhead on a mounting pole. The mounting pole may also carry an aerially suspended main fiber optic line with a branch line routed to the FDH. The FDH is accessed by a technician when it is necessary to establish and/or reconfigure optical connections within the FDH. For example, it may be desired to connect a particular intermediate fiber currently parked at one of the storage modules to a particular outgoing fiber. To reconfigure the optical connections within the FDH, the technician must gain access to the FDH. This may be done by climbing a ladder or the mounting pole itself in the case of the pole mounted FDH. Upon reaching the FDH, a cabinet door of the FDH is opened exposing a storage panel. According to the present disclosure, an example storage panel may be rotatably mounted on a vertical axis or a horizontal axis. The storage panel is opened, exposing multiple parking locations for the storage modules on the storage panel and the termination region behind the storage panel. The desired intermediate fiber is removed from its parking location and connected to the desired outgoing fiber at the termination region. The storage panel is then closed followed by closing (i.e., shutting) the cabinet door.

According to the present disclosure, a multi-configuration mounting system enables a mounting configuration of the FDH to be chosen based on the specific application. Variables such as the mounting location of the FDH, obstacles surrounding the mounting location of the FDH, and access methods available to the technician to reach the FDH may be considered when choosing the configuration of the FDH. The configuration selection of the storage panel may be jointly considered with the mounting configuration selection of the FDH. According to the present disclosure, an example FDH, utilizing the multi-configuration mounting system, has three mounting configuration positions on a mounting pole. The three FDH mounting configuration positions include a right side, a back side, and a left side mounting configuration position. In addition, the multi-configuration mounting system includes a set of rearrangeable mounting brackets that can be arranged to effectuate a short mounting pole offset or an extended mounting pole offset.

Given a specific application, the FDH mounting configuration and the storage panel configuration may be chosen based on convenience of service to the technician. For example, an application may have an existing mounting pole available to mount an FDH overhead. The example mounting pole may be near existing obstacles which require either the right side mounting configuration or the left side mounting configuration. The left side mounting configuration position and extended mounting pole offset may be chosen if it offers a suitable ground surface for placement of the ladder. When the cabinet door of the FDH is opened, the ladder placement provides the technician with convenient access to the interior of the FDH. However, choosing the vertical axis mounting configuration for the storage panel may result in screening the technician's view of the termination region when the storage panel is opened. In this case, the horizontal axis mounting configuration for the storage panel is chosen providing the technician with convenient access to both the storage module (s) and the termination region. Other specific applications may favor other mounting configurations for the FDH and the storage panel within the FDH. For example, installations with limited room in front of and no room to the sides of the mounting pole may favor the back side FDH mounting configuration position and short mounting pole offset in combination with the vertical axis storage panel mounting configuration.

A variety of additional aspects will be set forth in the description that follows. The aspects can relate to individual features and to combinations of features. It is to be understood that both the forgoing general description and the following detailed description are exemplary and explanatory only and are not restrictive of the broad concepts upon which the embodiments disclosed herein are based.

BRIEF DESCRIPTION OF THE DRAWINGS

FIG. 6 is a perspective view showing the front, top, and right side of the example fiber distribution hub of FIG. 3 having the front door removed and the vertically configured hinged storage panel shown in an open position;

FIG. 7 shows an enlarged portion of FIG. 6 illustrating a parking location holding a storage module on the hinged storage panel of FIG. 3;

FIG. 8 is a perspective view showing a rear, top, and right side of the storage module of FIG. 7;

FIG. 9 is a perspective view showing the rear, top, and a left side of the storage module of FIG. 7 holding a connectorized fiber and a connector dust cap;

DETAILED DESCRIPTION

Figure 1:
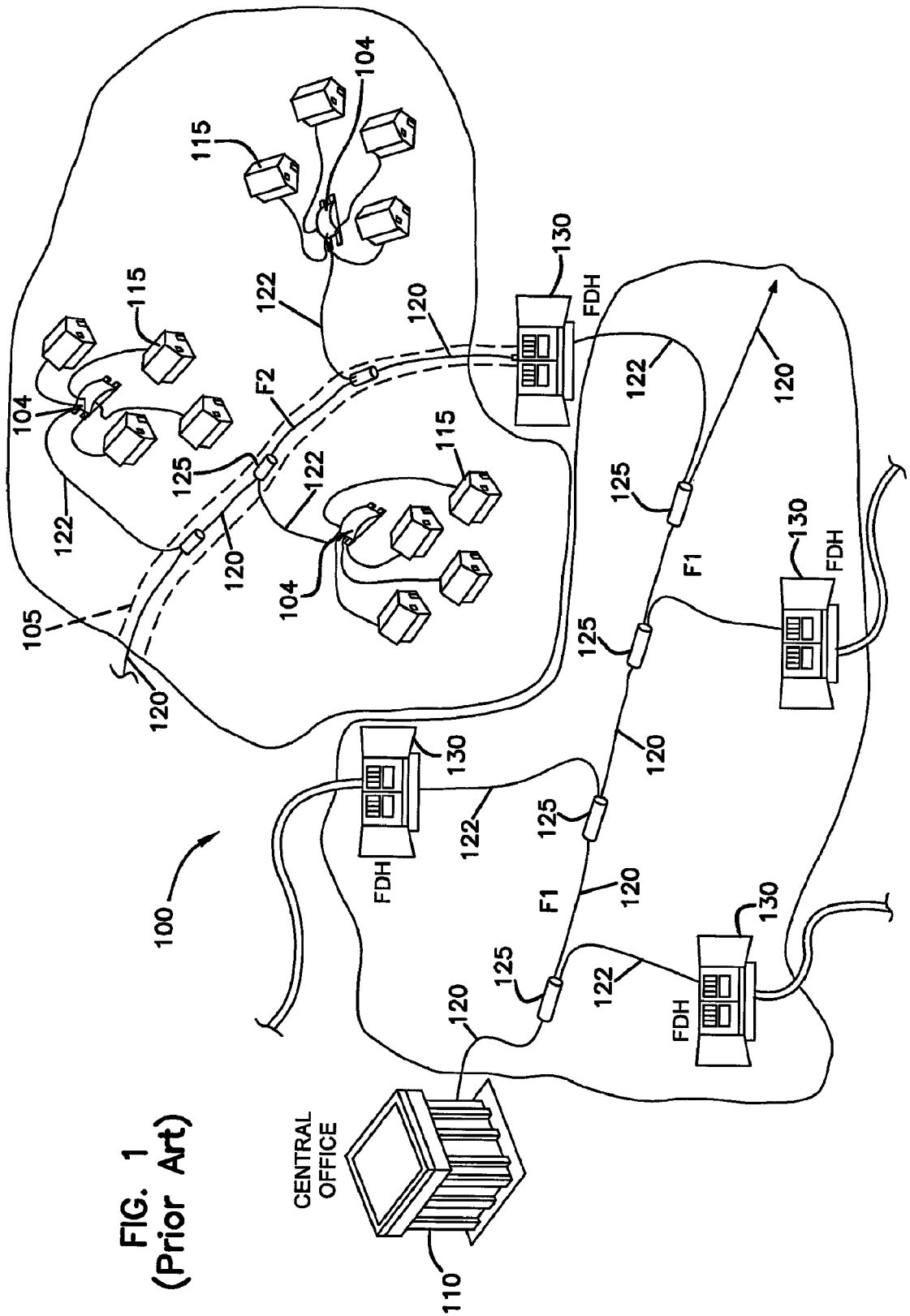
FIG. 1 shows a prior art passive fiber optic network.

The present disclosure relates to fiber optic cable systems. In particular, a fiber optic distribution system includes one or more fiber distribution hubs (FDHs) that provide an interface between a central office 110 and subscribers 115. The FDH contains terminated incoming fibers, coming from the central office 110, and terminated outgoing fibers, each going to one of the subscribers 115. Optical connections between the incoming fibers and the outgoing fibers may be established and rearranged within the FDH. A hinged storage panel, described and illustrated in example embodiments below, provides multiple mounting locations for multiple storage modules. The storage modules organize and hold the terminated incoming fibers until they are connected to the terminated outgoing fibers at a termination region, also described in example embodiments below. In preferred embodiments, the hinged storage panel covers the termination region unless and until the FDH is being serviced (e.g., when optical connections are being established and/or rearranged). When the FDH is serviced, the hinged storage panel uncovers the termination region and holds the storage modules in convenient proximity to the termination region. This convenient proximity facilitates manually establishing and switching the optical connections between the storage modules and the termination region. Various applications and mounting locations exist for FDHs. According to the present disclosure, the hinged storage panel is mountable to multiple configurations and is mounted on at least one variable position hinge. A configuration for the hinged storage panel is chosen based upon the given application and mounting location of the FDH among other things. Additional information on such FDHs is disclosed at U.S. Provisional Patent Application Ser. No. 60/990,609, filed Nov. 27, 2007, and at U.S. patent application Ser. No. 12/276,005, filed Nov. 21, 2008, now U.S. Patent Publication No. 2009/0263096 A1, published Oct. 22, 2009, both entitled FIBER DISTRIBUTION HUB WITH MULTIPLE CONFIGURATIONS, which are hereby incorporated by reference in their entirety.

The FDH includes a cabinet enclosing the optical connections, the hinged storage panel, the termination region, and other components when closed. The cabinet is openable to expose the optical connections, the hinged storage panel, the termination region, and other components when being serviced. According to the present disclosure, the FDH cabinet is mountable in multiple configurations and locations in various environments. For example, FDH mounting locations include overhead on a mounting pole, on a wall, on a pedestal, and within an underground vault. Various environments may include obstacles near the FDH that interfere with access to the FDH and the servicing of the FDH. A mounting configuration for the FDH cabinet is chosen based upon the given application, mounting location, and environment of the FDH. Furthermore, the combination of the hinged storage panel configuration and the FDH cabinet mounting configuration may be considered together, further matching the overall FDH configuration to the given application, mounting location, and environment.

An example FDH cabinet includes multiple mounting areas each adapted for fastening to a mounting bracket set to facilitate the multiple mounting configurations. In one embodiment, the mounting bracket set is adapted to mount the FDH cabinet at one of the mounting areas to a mounting pole. In other embodiments, another mounting bracket set may be adapted to mount the FDH cabinet at one of the mounting areas to, for example, a wall, an underground vault, or other mounting location. An example mounting bracket set and other cabinet details are described in detail below.

Figure 2:
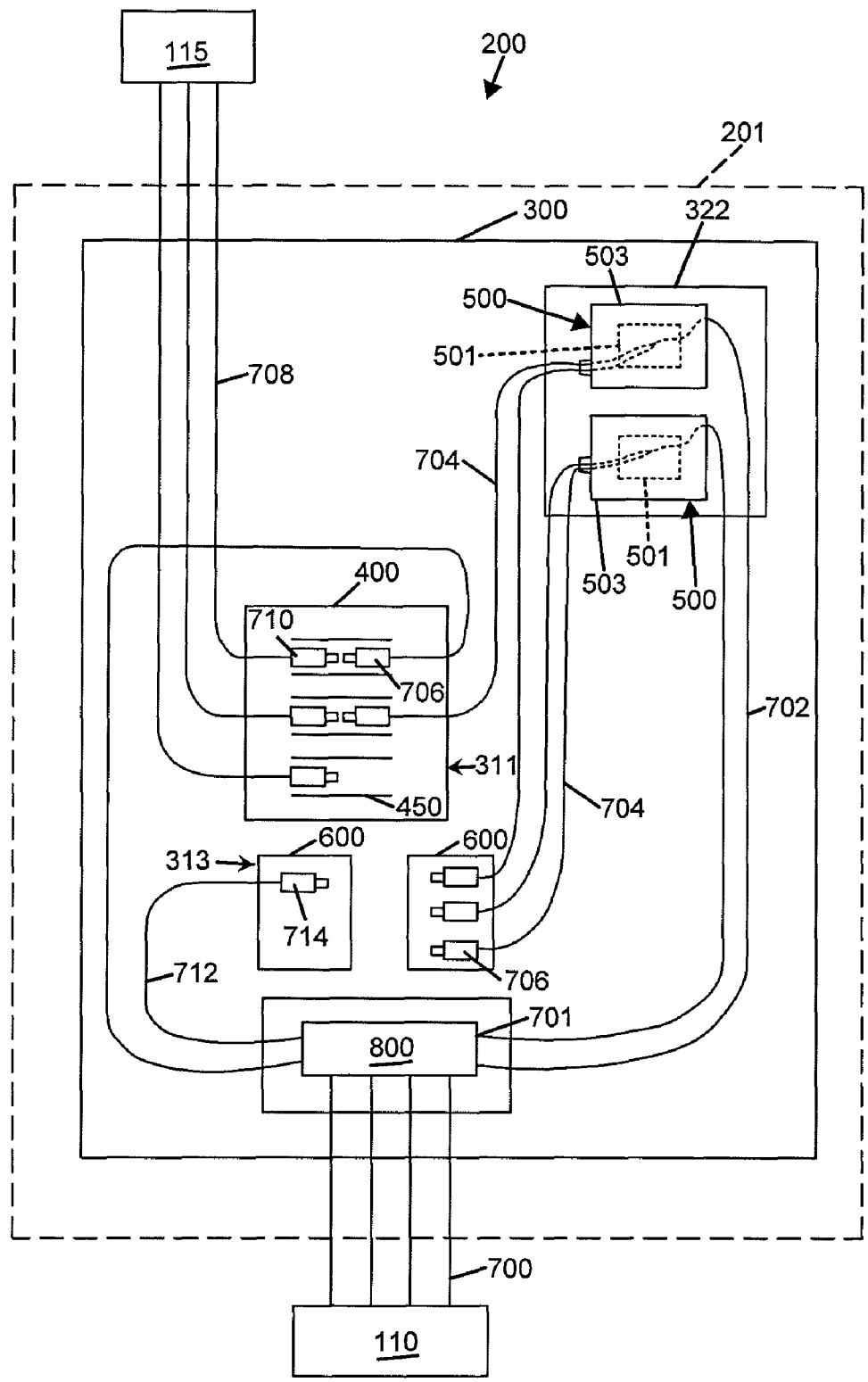
FIG. 2 is a schematic diagram showing an example cable routing scheme for a fiber distribution hub.

Turning now to the figures, FIG. 2 is a schematic diagram showing an example cable routing scheme for example FDH 200. The FDH 200 generally administers connections at a termination region 311 between incoming fibers and outgoing fibers in an Outside Plant (OSP) environment. As the term is used herein, "a connection" between fibers includes both direct and indirect connections. Examples of incoming fibers include feeder cable 700 fibers that enter the FDH 200 and intermediate fibers (e.g., connectorized pigtails 704 extending from splitters 500 and patching fibers/jumpers) that connect the feeder cable 700 fibers to the termination region 311. Examples of outgoing fibers include subscriber cable 708 fibers that exit the FDH 200 and any intermediate fibers that connect the subscriber cable 708 fibers to the termination region 311. The FDH 200 provides an interconnect interface for optical transmission signals at a location in the network where operational access and reconfiguration are desired. For example, as noted above, the FDH 200 can be used to split the feeder cables 700 and connect the split feeder cables 700 to distribution cables 708 routed to subscriber locations 115. In addition, the FDH 200 is designed to accommodate a range of alternative sizes and fiber counts and support factory installation of pigtails 704, fanouts, and splitters 500.

Figure 16:
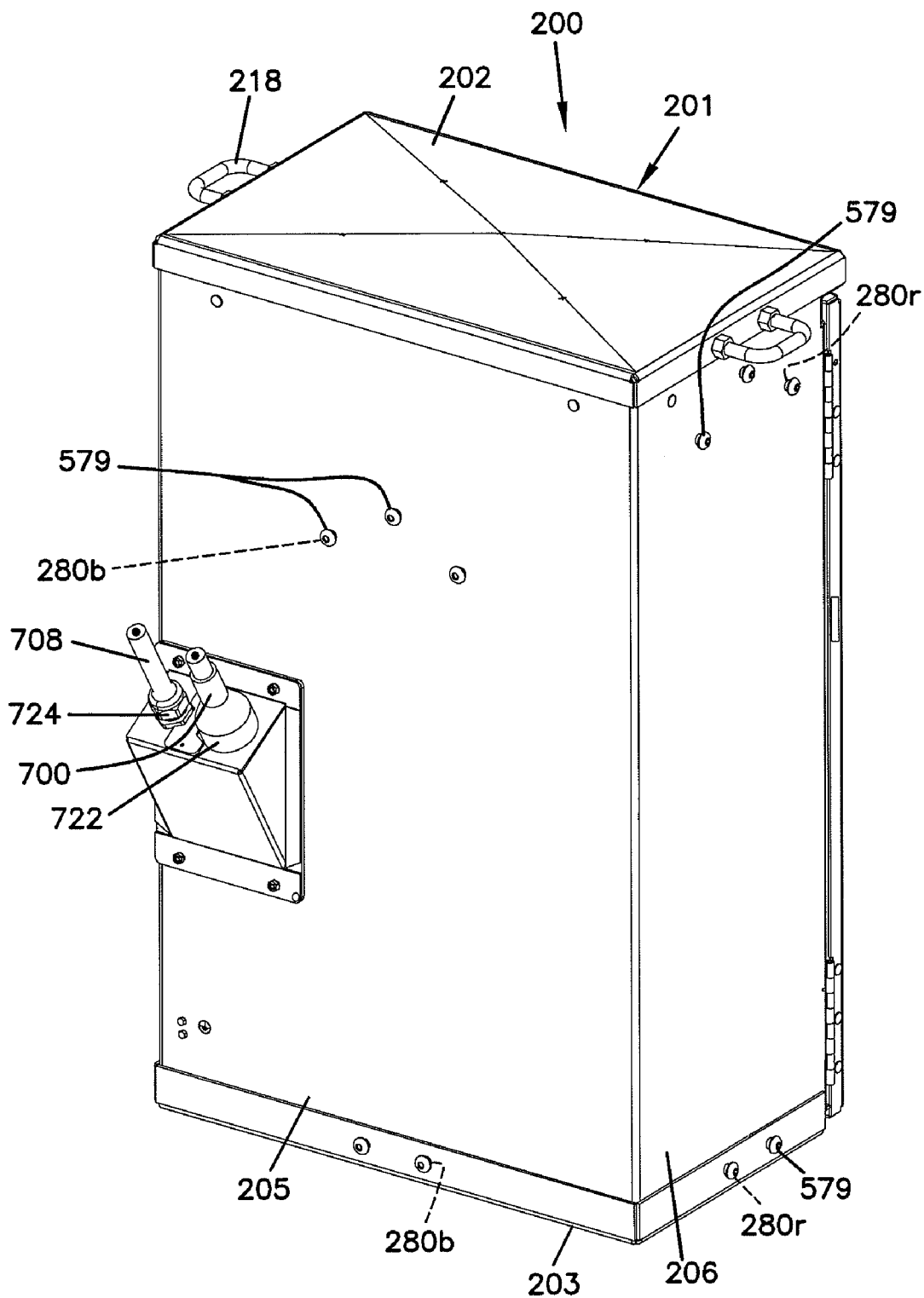
FIG. 16 is a perspective view showing a rear, the top, and the right side of the example fiber distribution hub of FIG. 3, the view illustrating an entrance location for incoming fibers and an exit location for outgoing fibers.

As shown at FIG. 2, the feeder cable 700 is initially routed into the example FDH 200 through a cabinet 201 (e.g., typically through the back or bottom of the cabinet 201 as shown at FIG. 16). In certain embodiments, the fibers of the feeder cable 700 can include ribbon fibers. An example feeder cable 700 may include twelve to forty-eight individual fibers connected to the service provider's central office 110. In certain embodiments, after entering the cabinet 201, the fibers of the feeder cable 700 are routed to a feeder cable interface 800 (e.g., fiber optic adapter modules, a splice tray, etc.). At the feeder cable interface 800, one or more of the fibers of the feeder cable 700 are individually connected to ends 701 of separate splitter input fibers 702. The splitter input fibers 702 are routed from the feeder cable interface 800 to a splitter mounting location 322 at which a plurality of splitter modules 500 can be mounted. In certain embodiments, the feeder cable interface 800 can be located at the splitter mounting location 322 such that the splitter modules plug directly into the feeder cable interface (e.g., see U.S. Pat. No. 7,418,181 that is hereby incorporated by reference). Each splitter module 500 includes at least one fiber optic splitter 501 positioned within a splitter housing 503. At the splitter mounting location 322, the splitter input fibers 702 are optically connected to separate splitter modules 500, wherein the input fibers 702 are each split by the fiber optic splitters of the splitter module 500 into multiple pigtails 704, each having a connectorized end 706.

When the pigtails 704 are not in service, the connectorized ends 706 can be temporarily stored on a storage module 600 that is mounted at a storage region 313 of a swing frame 300. When the pigtails 704 are needed for service, the pigtails 704 are routed from the splitter modules 500 to a termination module 400 that is provided at the termination region 311 of the swing frame 300. At the termination module 400, the connectorized ends 706 of the pigtails 704 are connected to the connectorized ends 710 of the fibers of the distribution cable 708 within an adapter 450. The termination region 311 is the dividing line between the incoming fibers and the outgoing fibers. A typical distribution cable 708 forms the F2 portion of a network (see FIG. 1) and typically includes a plurality of fibers (e.g., 144, 216 or 432 fibers) that are routed from the FDH 200 to subscriber locations 115.

In certain embodiments, one or more of the fibers of the feeder cable 700 are not connected to any of the splitter modules 500. Rather, these fibers of the feeder cable 700 are connected to pass-through fibers 712 having connectorized ends 714. The pass-through fibers 712 are connected to the termination modules 400, without first connecting to the splitter modules 500. By refraining from splitting the fiber 712, a stronger signal can be sent to one of the subscribers. The connectorized ends 714 of the pass-through fibers 712 can be stored at the storage region 313 when not in use.

The splitter modules 500 and storage modules 600 can be incrementally added to the swing frame 300. The connectorized pigtails 704 are typically stored in one or more storage modules 600 prior to installation on the swing frame 300. In certain embodiments, the connector 706 of each pigtail 704 is secured in a storage module 600 before the splitter module 500 leaves the factory.

As illustrated at FIGS. 8 and 9, the storage module 600 includes a body 610 having a front side 602, a rear side 604, a top, and a bottom. The body 610 is configured to hold at least one fiber connector 706 within at least one port 606. The body 610 is configured to hold about sixteen connectors 706 and includes about sixteen ports 606, although other port counts (e.g., 2 ports, 4 ports, 6 ports, 8 ports, etc.) can also be used. In certain embodiments, the body 610 is arranged to retain the fiber connectors 706 in a single row configuration. In other embodiments, the body 610 can be arranged to hold the connectors 706 in a square pattern or in any other desired configuration. When one of the ports 606 is not occupied by one of the connectors 706, an adapter dust plug 453 can be stored within the port 606. A plurality of dust cap holders 616 are provided on the body 610 to store connector 706 dust caps 458. A latch 612 is provided near the top of the body 610 and a tab 614 is provided near the bottom for mounting purposes. More information regarding the storage modules 600 can be found at U.S. Pat. No. 7,198,409, issued on Apr. 3, 2007, entitled FIBER OPTIC CONNECTOR HOLDER AND METHOD; at U.S. Pat. No. 7,233,731, issued on Jun. 19, 2007, entitled TELECOMMUNICATIONS CONNECTION CABINET; and at U.S. Pat. No. 7,218,827, issued on May 15, 2007, entitled MULTI-POSITION FIBER OPTIC CONNECTOR HOLDER AND METHOD which are hereby incorporated by reference in their entirety.

In certain embodiments, as illustrated at FIGS. 6 through 10, the storage region 313 is defined in part by a variable position, hinged storage panel 250. The storage panel 250 includes a plurality of upper openings 266 and a plurality of lower openings 268. The latch 612 of the storage module 600 is designed to removably snap into any of the upper openings 266 while the tab 614 is engaged in a paired lower opening 268. Each of the opening 266, 268 pairs defines a storage module 600 mounting location 264 which can be arranged in any desired configuration within the storage panel 250. In the example shown at FIG. 6, the storage panel 250 defines twenty-two of the storage module 600 mounting locations 264. Each of the opening 266, 268 pairs is configured to receive a storage module body 610 arranged to retain sixteen fiber connectors 706 in a row. Other embodiments may employ fewer or more than twenty-two of the mounting locations 264 and may employ storage module bodies arranged to retain fewer or more than sixteen fiber connectors 706.

Figure 21:
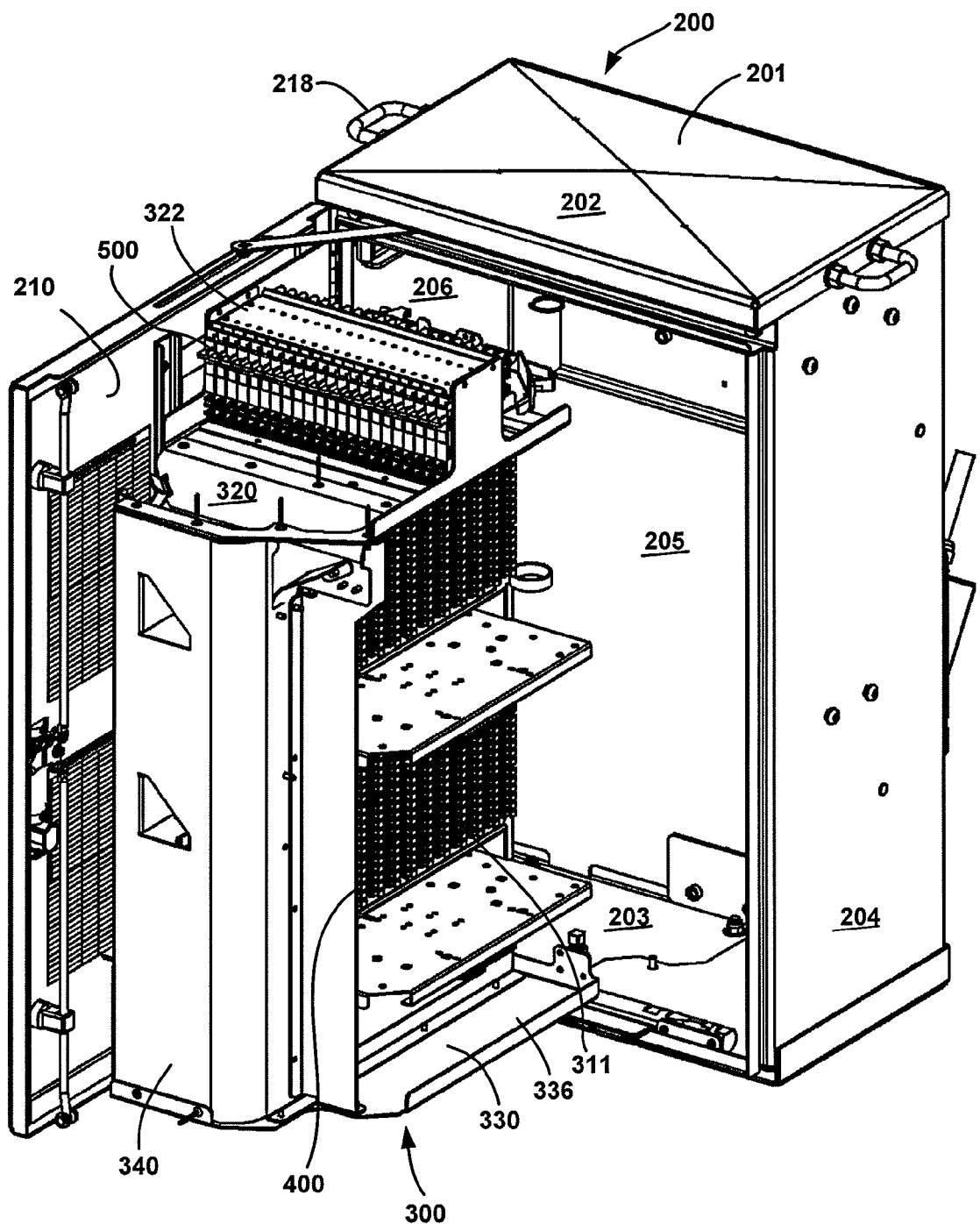
FIG. 21 is a perspective view showing the front, top, and left side of the example fiber distribution hub of FIG. 3 with the front door shown in the open position and the swing frame of FIG. 10 shown in a service position.

When one of the splitter modules 500 is loaded into the splitter mounting location 322 during installation (see FIG. 21), the corresponding storage modules 600 are loaded onto the storage panel 250. For ease in viewing FIG. 10, only two sets of splitter outputs are illustrated, each having one set of pigtails 704 and one storage module 600. The pigtail 704 sets extending from the splitter modules 500 to the storage modules 600 are routed along a path 705 through one or more guide rings 270 that allows the hinged storage panel 250 to rotate through a desired range-of-motion.

Figure 10:
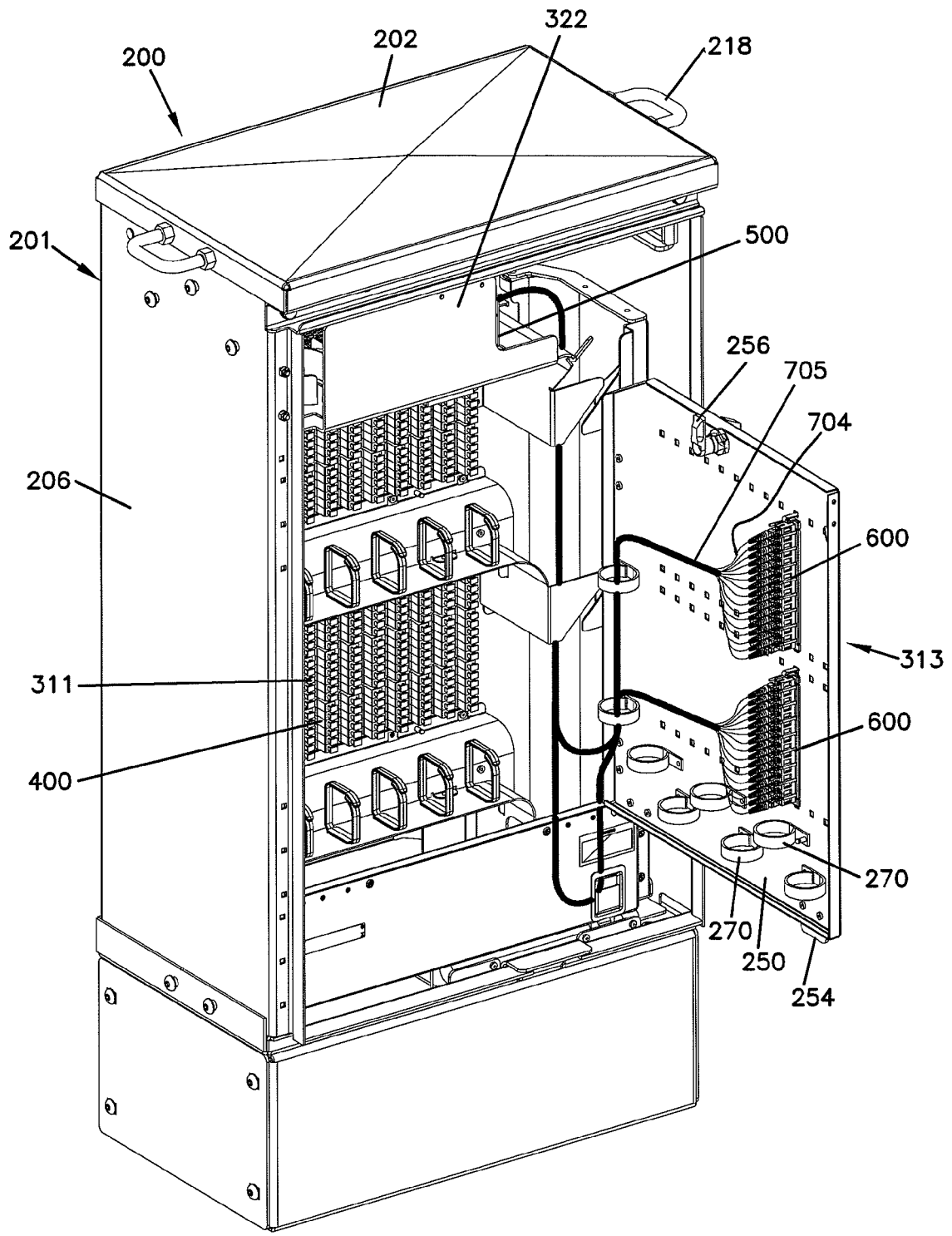
FIG. 10 is a perspective view showing the front, top, and right side of the example fiber distribution hub of FIG. 3 having the front door removed and the vertically configured hinged storage panel shown in the open position of FIG. 6, the view illustrating an example cable/fiber route from a splitter module mounted on a swing frame to the storage module of FIG. 7 mounted on the hinged storage panel of FIG. 3.
Figures 14, 15:
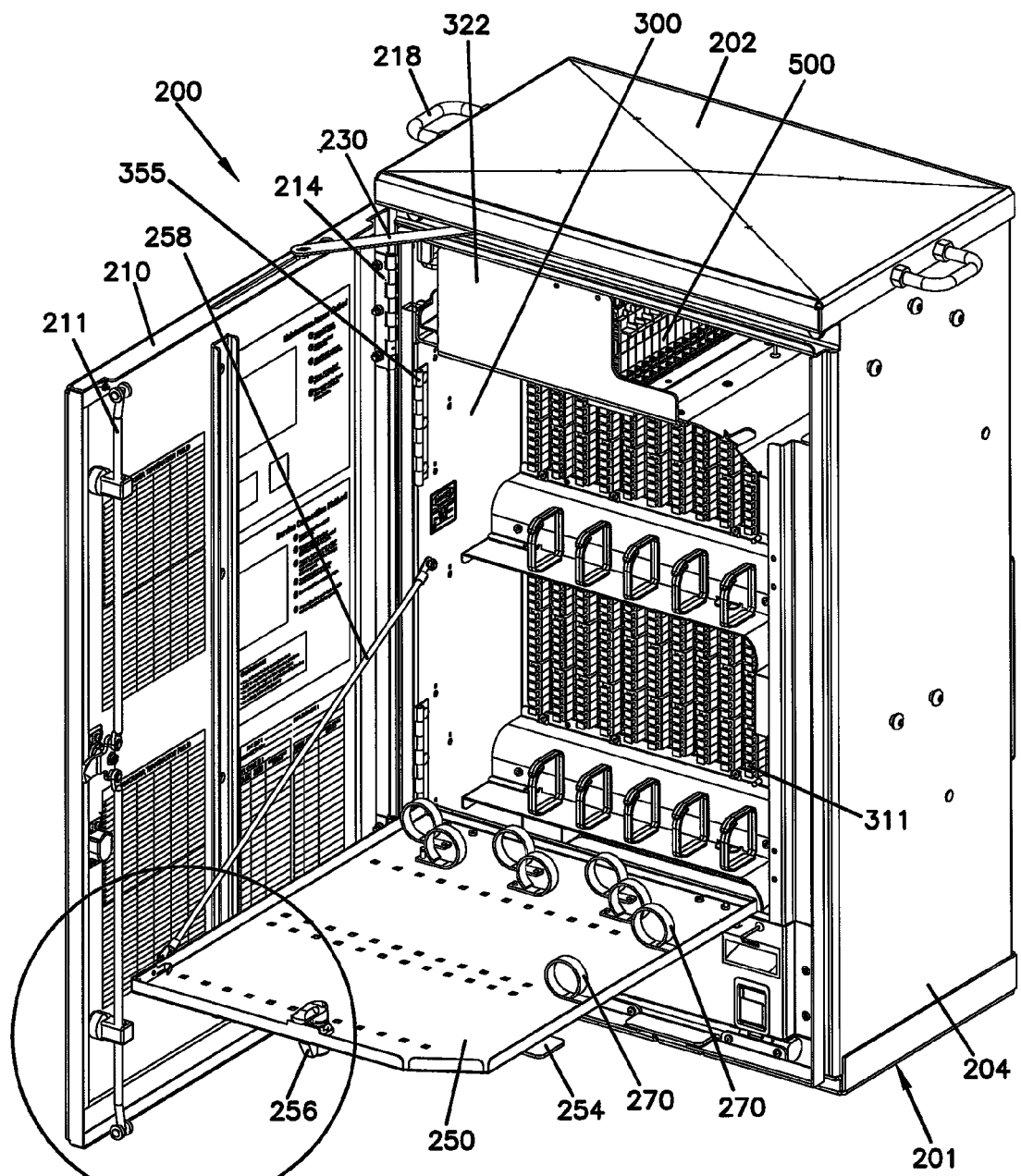
FIG. 14 is a perspective view showing the front, top, and left side of the example fiber distribution hub of FIG. 3 with the horizontally configured hinged storage panel shown in another open position.
FIG. 15 shows an enlarged portion of FIG. 14 illustrating a storage panel support cable with a ring terminal and a storage panel support hook.
Figure 15:
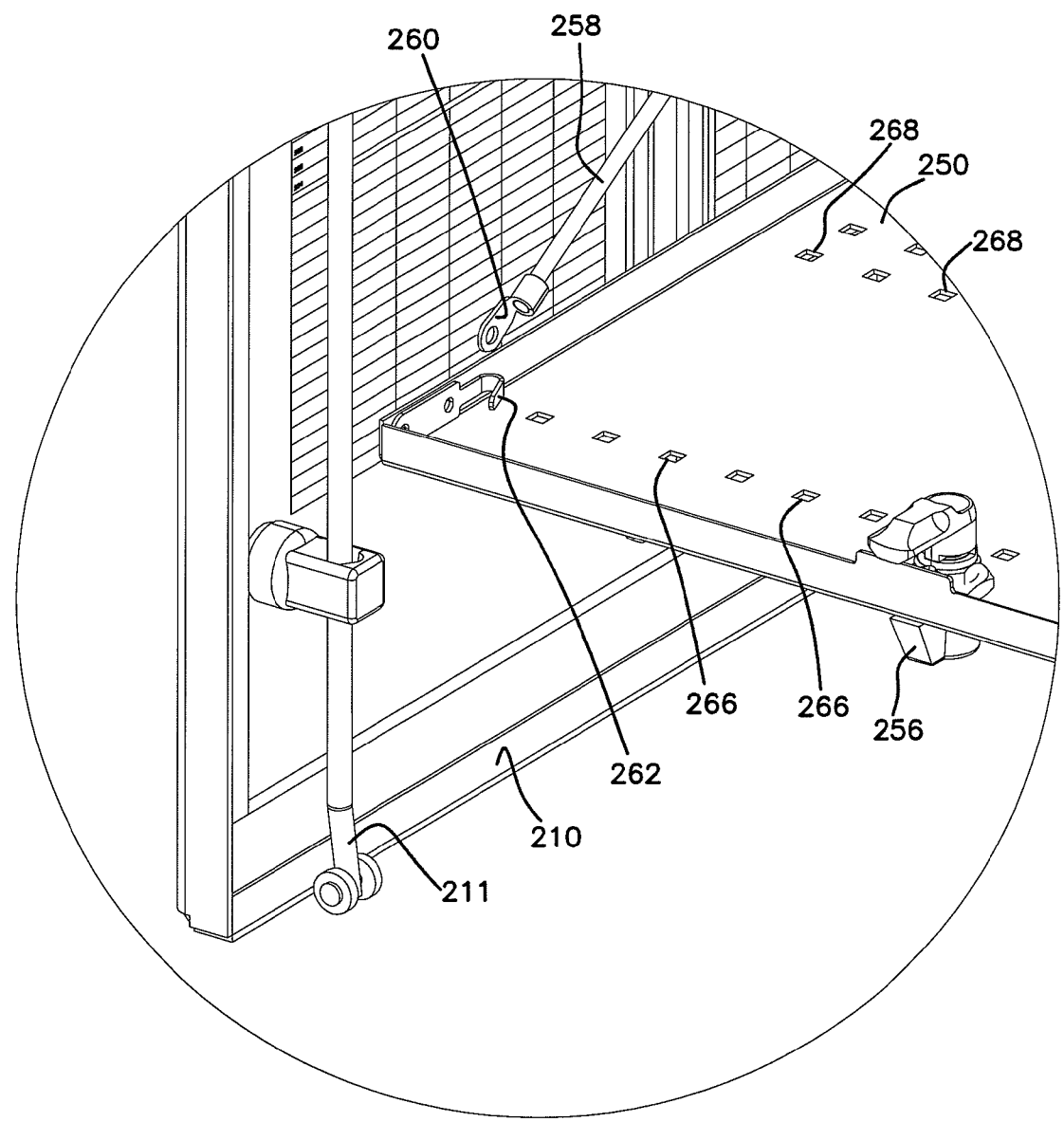

The range-of-motion includes an open position (see FIGS. 6, 10, 14, and 15) and a closed position (see FIGS. 3 and 11) of the hinged storage panel 250. The open position can be one of several open positions depending on the configuration of the hinged storage panel 250 as will be further described hereinafter. For example FIGS. 6 and 10 show one open position of the hinged storage panel 250 and FIGS. 14 and 15 show another open position. The hinged storage panel 250 is moveable between the closed position and the open position. The hinged storage panel 250 is typically in the closed position when the FDH 200 is in normal service and when the FDH 200 is being stored or transported (e.g., before the FDH 200 is initially installed). The hinged storage panel 250 is typically moved to the open position when certain service operations are performed on the FDH 200 by the technician (e.g., the connectorized ends 706 are reconfigured between being stored on the hinged storage panel 250 and being placed in service on the termination region 311 of the swing frame 300). After the service operation is completed, the hinged storage panel 250 is typically returned to the closed position.

Referring now to FIGS. 3 through 7, 10 through 18, and 20, the example fiber distribution hub (FDH) 200 in accordance with the principles of the present disclosure is shown. The example FDH 200 includes the example cabinet 201 that houses internal components. The example cabinet 201 has a top panel 202, a bottom panel 203, a left side panel 204, a back panel 205, and a right side panel 206. At least one cabinet door 210 covers the cabinet 201 front when closed. The door 210 is rotatably mounted to the cabinet 201 by at least one hinge 214 and is secured to the cabinet 201 by a door latch 211 when closed. The door 210 is held at certain open positions by a door stay assembly. As illustrated at FIG. 16, the cabinet 201 includes an opening 722 through which the feeder cable (e.g., or F1 cable) 700 enters and another opening 724 through which the subscriber cable 708 exits the cabinet 201.

Figure 17:
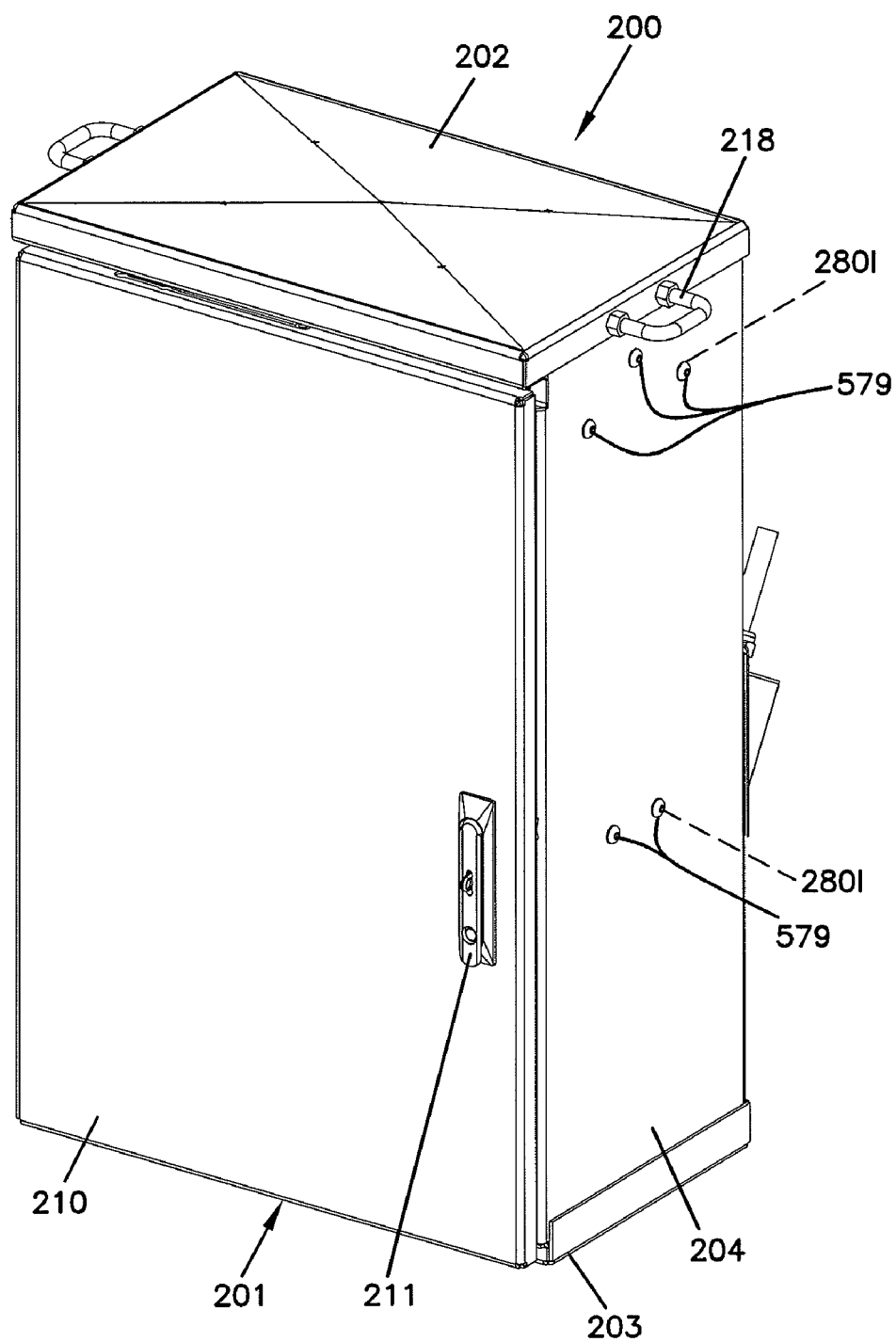
FIG. 17 is a perspective view showing the front, top, and left side of the example fiber distribution hub of FIG. 3 with the front door shown in a closed position.

As illustrated at FIGS. 16 and 17, the example FDH cabinet 201 includes three sets of mounting holes 280*b*, 280*l*, and 280*r*, each set 280*b*, 280*l*, 280*r* defining a separate mounting area. The mounting hole set 280*b* facilitates mounting the FDH 200 on its back panel 205. Likewise, the mounting hole set 280*r* facilitates right side panel 206 mounting and the mounting hole set 280*l* facilitates left side panel 204 mounting. In other embodiments, two or fewer mounting area(s) may be provided. In still other embodiments, four or more mounting areas may be provided.

In general, the cabinet 201 of the FDH 200 is configured to protect the internal components against rain, wind, dust, rodents and other contaminants. However, the cabinet 201 remains relatively lightweight for easy installation and breathable to prevent accumulation of moisture in the FDH 200. In certain embodiments, an aluminum construction with a heavy powder coat finish also provides for corrosion resistance. In one example embodiment, the cabinet 201 is manufactured from heavy gauge aluminum and is NEMA-4X rated. In other embodiments, however, other materials can also be used. As shown at FIGS. 3, 11, 14, 16, and 21, loops 218 can be provided on the cabinet 201 for facilitating deployment of the cabinet 201 at a desired location. The loops 218 can be used to position the cabinet 201 using a crane. In particular, the crane can lower the cabinet 201 into an underground region. In certain embodiments, the loops 218 are removable or can be adjusted to not protrude from the top cabinet panel 202.

Referring now to FIGS. 3, 10, 11, 14, and 21, the swing frame 300 is pivotably mounted on hinges 355 within and to the cabinet 201 and supports the termination region 311 among other things. The swing frame 300 is moveable between a stowed position (see FIGS. 3, 10, 11, and 14) and a service position (see FIG. 21). The swing frame 300 is typically in the stowed position when the FDH 200 is in normal service and when the FDH 200 is being stored or transported (e.g., before the FDH 200 is initially installed). The swing frame 300 is typically moved to the service position when certain service operations are performed on the FDH 200 by the technician (e.g., when reconfiguring, adding, or removing the pigtails 704, the fanouts, the splitters 500, the feeder cable 700, the feeder cable interface 800, the splitter input fibers 702, etc.) After the service operation is completed, the swing frame 300 is typically returned to the stowed position. The swing frame 300 includes a top panel 320, a bottom panel 330, a left panel 340, and a rear portion 336. The storage panel 250 is mounted to the swing frame 300 with a pair of variable position hinges 252 and can hold at least one storage module 600. Further details regarding swing frames, termination regions, storage panels, storage modules, and FDHs in general are disclosed at U.S. Patent Application Publication No. 2007/0189691 A1, published Aug. 16, 2007, now U.S. Pat. No. 7,720,343, issued May 18, 2010, entitled FIBER DISTRIBUTION HUB WITH SWING FRAME AND MODULAR TERMINATION PANELS; at U.S. Patent Application Publication No. 2006/0008231 A1, published Jan. 12, 2006, entitled HINGED PARKING IN FIBER DISTRIBUTION HUBS; and at U.S. Pat. No. 7,369,741, issued May 6, 2008, entitled STORAGE ADAPTER WITH DUST CAP POSTS, which are hereby incorporated by reference in their entirety.

Figure 3:
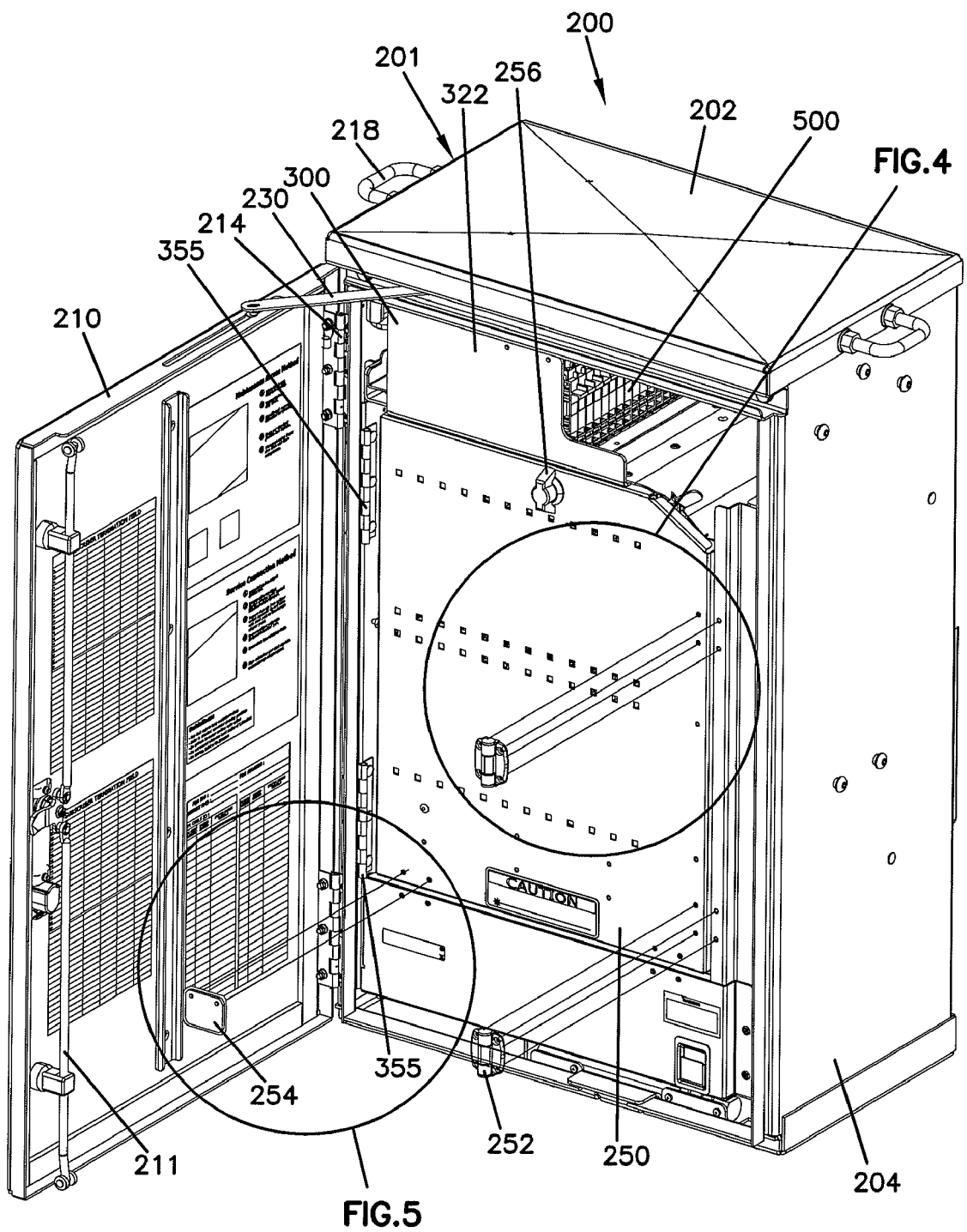
FIG. 3 is a perspective view showing a front, top, and left side of an example fiber distribution hub having a cabinet with a front door shown in an open position and a hinged storage panel configured in a vertical hinge configuration shown in a closed position.
Figure 4:
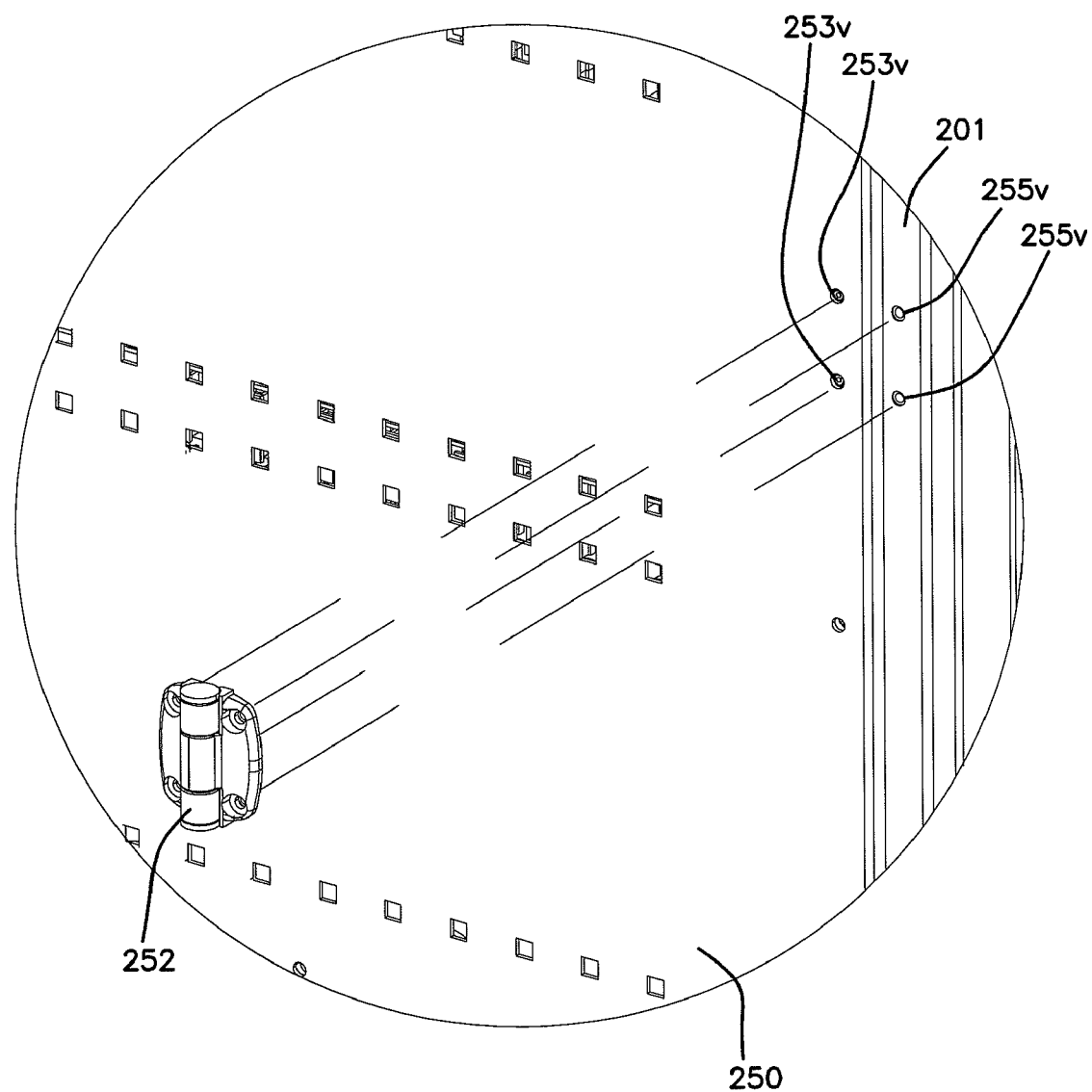
FIG. 4 shows an enlarged exploded portion of FIG. 3 illustrating a first hinge mounting position for mounting a hinge resulting in the vertical hinge configuration of FIG. 3.
Figure 5:
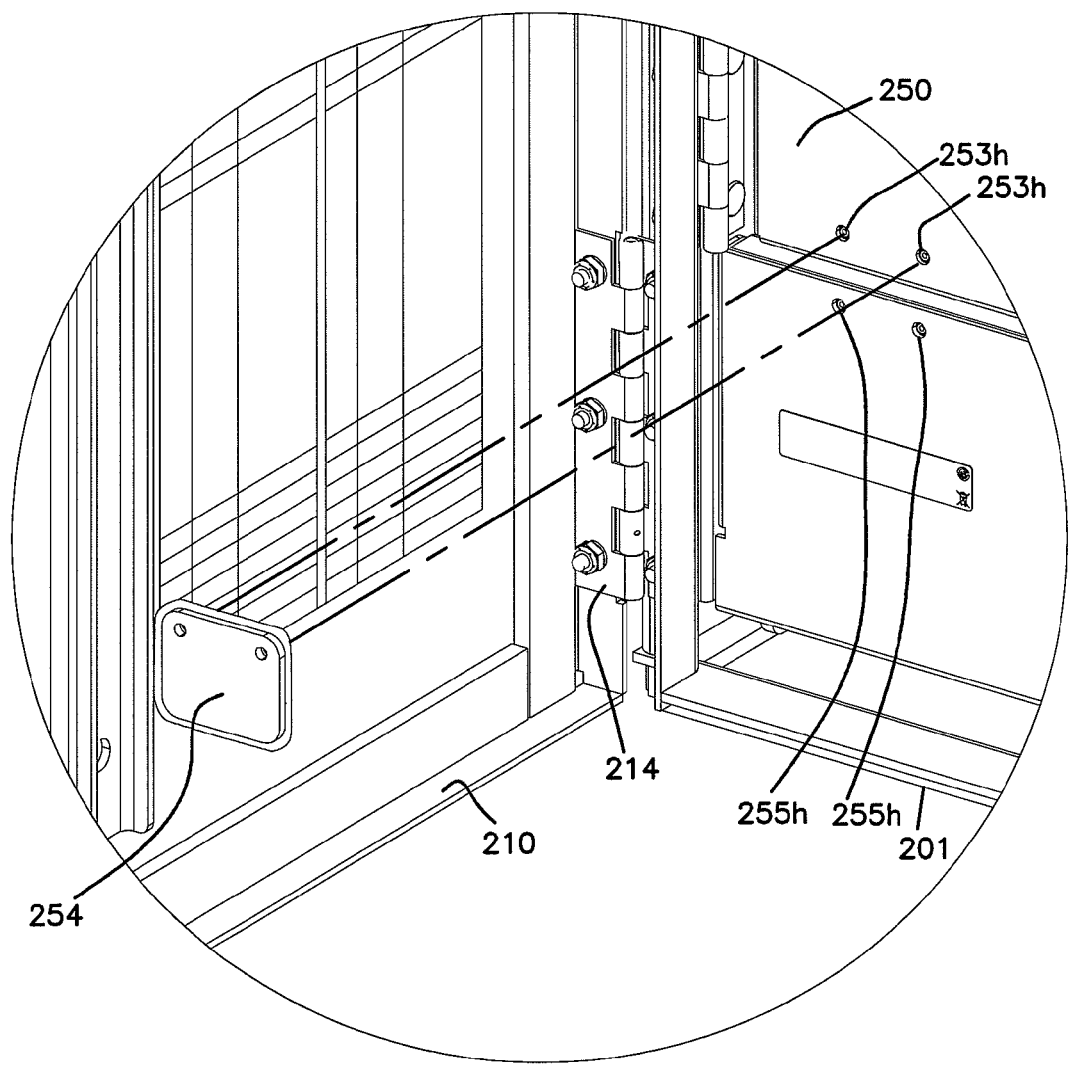
FIG. 5 shows an enlarged exploded portion of FIG. 3 illustrating a second hinge mounting position with a stop plate mounted thereon.
Figure 11:
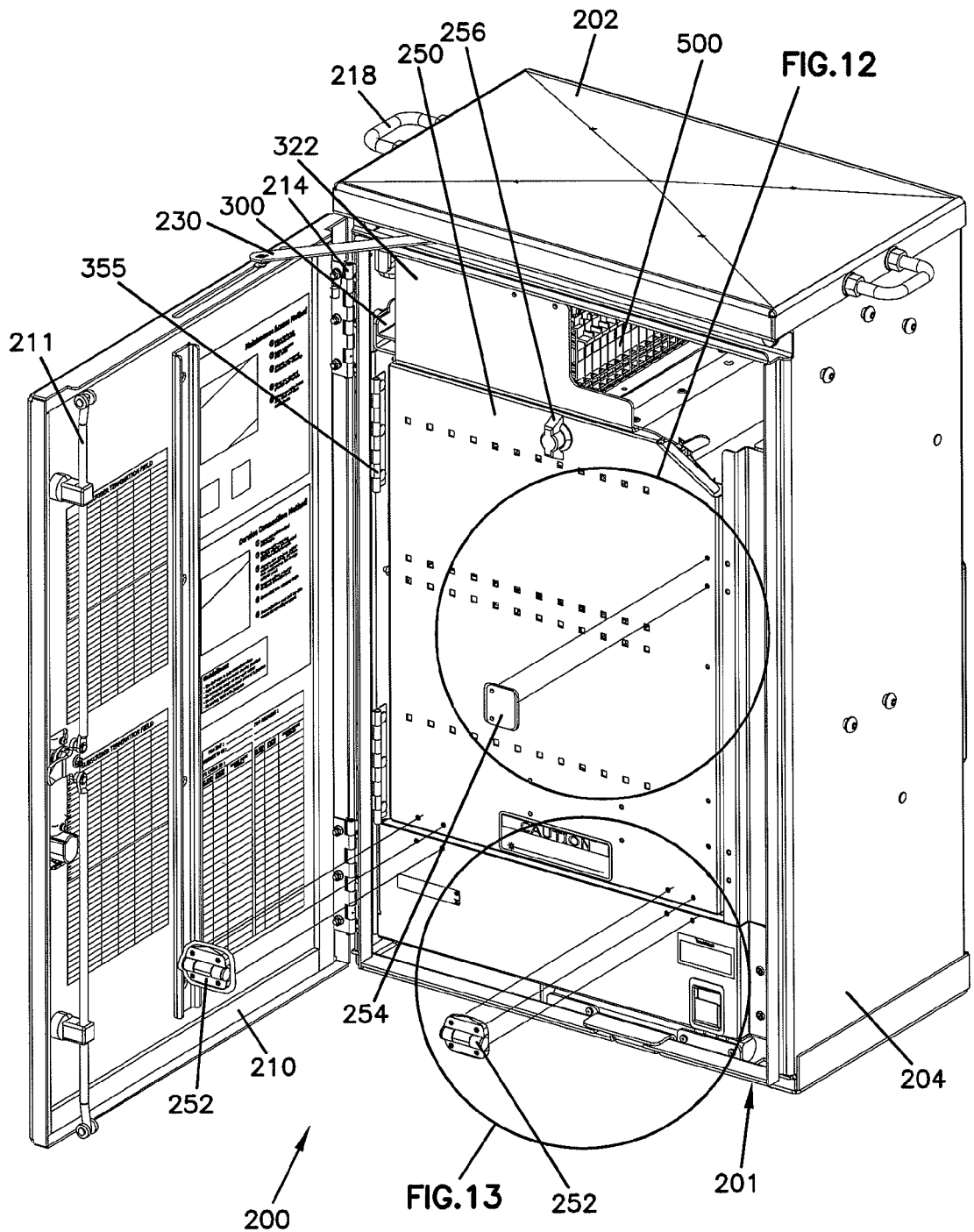
FIG. 11 is a perspective view showing the front, top, and left side of the example fiber distribution hub of FIG. 3 with the front door in the open position and the hinged storage panel configured in a horizontal hinge configuration shown in a closed position.
Figure 12:
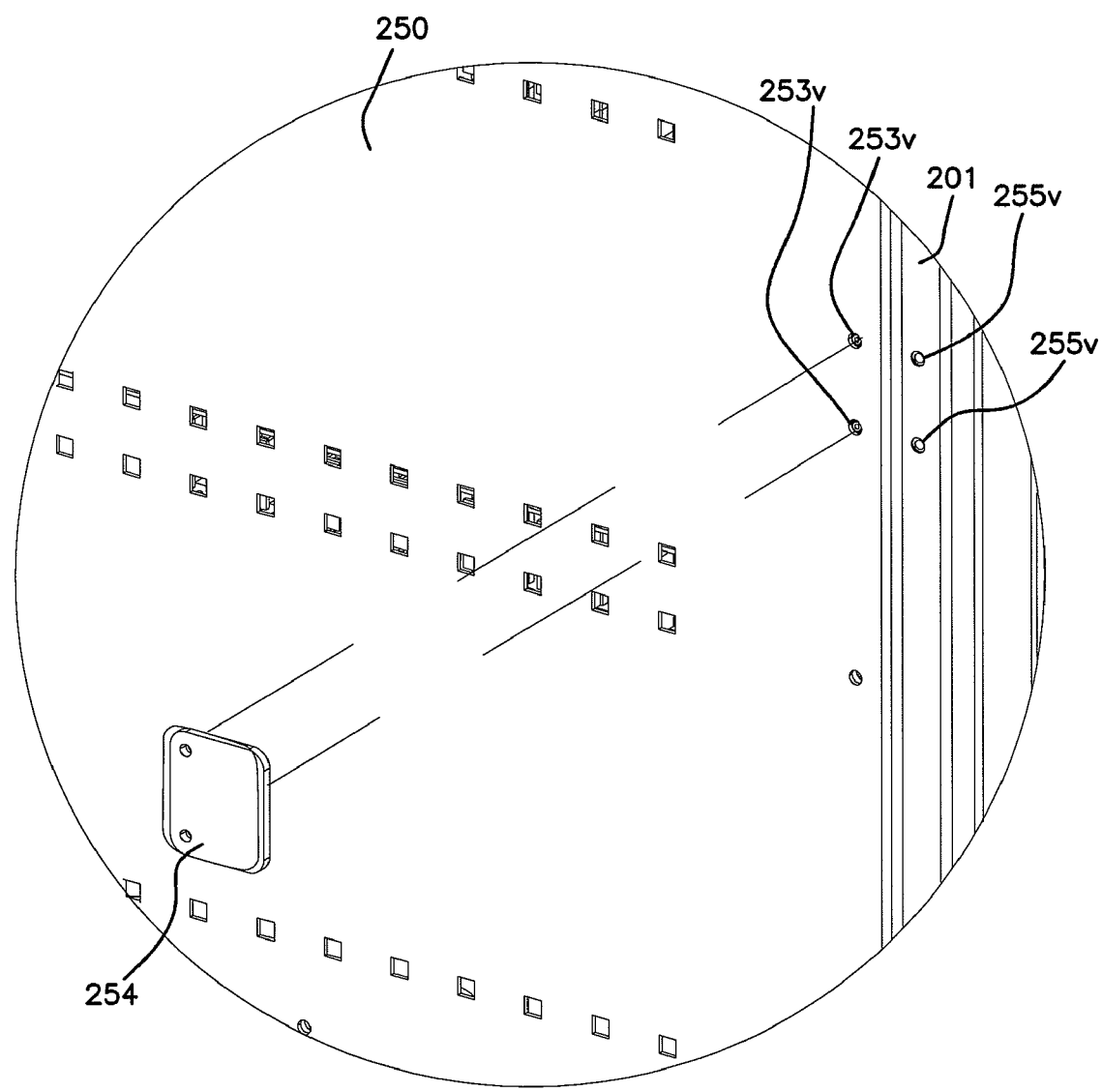
FIG. 12 shows an enlarged exploded portion of FIG. 11 illustrating the first hinge mounting position of FIG. 4 with the stop plate of FIG. 5 mounted thereon.
Figure 13:
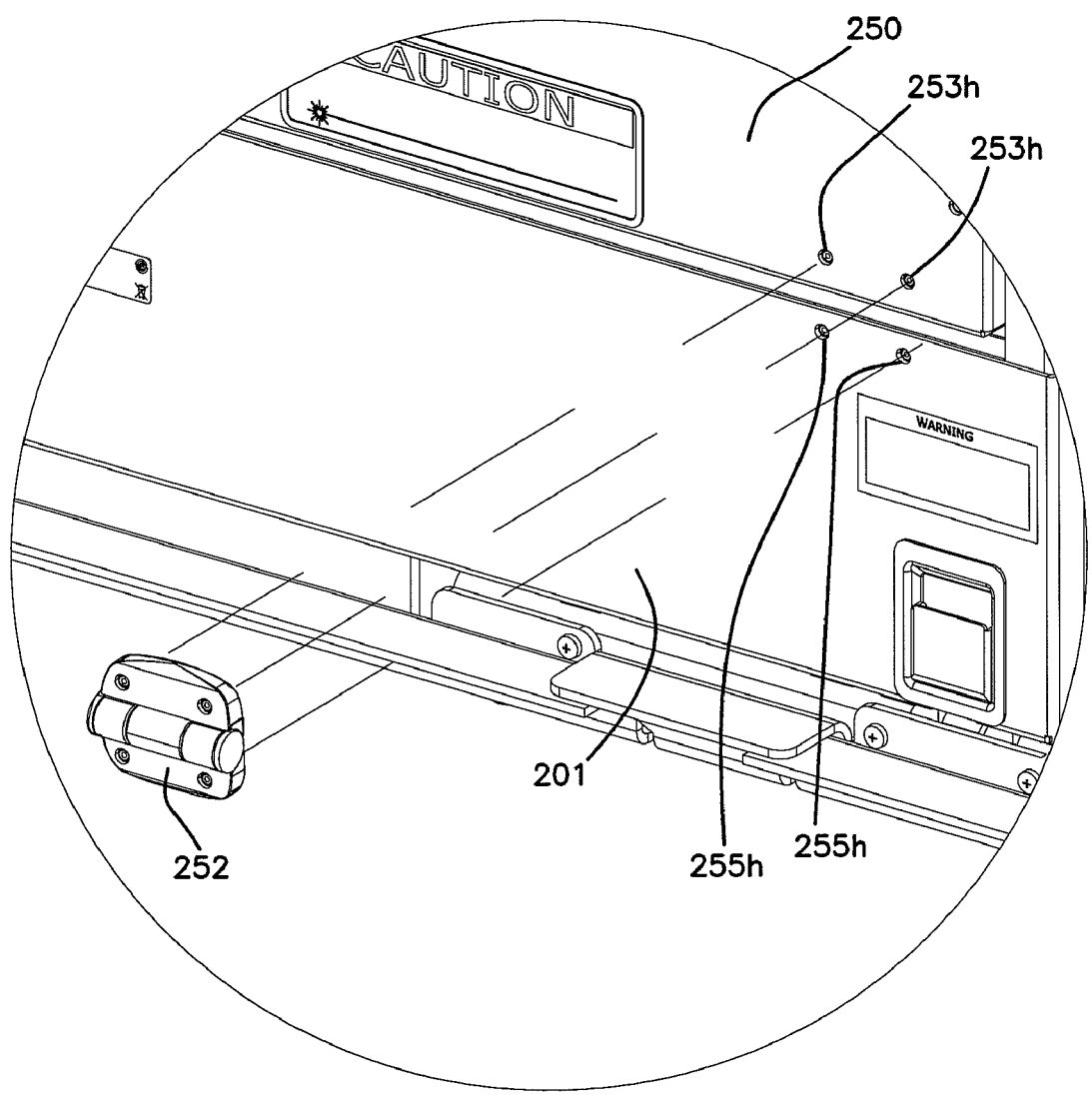
FIG. 13 shows an enlarged exploded portion of FIG. 11 illustrating a third hinge mounting position for mounting the hinge of FIG. 4 resulting in the horizontal hinge configuration of FIG. 11.

In a preferred embodiment, illustrated at FIGS. 3 through 5 and 11 through 15 the storage panel 250 can be configured with a vertical axis hinge 252 mount or a horizontal axis hinge 252 mount. As illustrated at FIGS. 3 and 4, the storage panel 250 includes a first set and a second set of vertical hinge mounting holes 253*v* matched to two sets of vertical hinge mounting holes 255*v* included on the swing frame 300. The vertical axis hinge 252 configuration is obtained by fastening one of the hinges 252 to the first set of mount holes 253*v*, 255*v* and the other hinge 252 to the second set of mounting holes 253*v*, 255*v*. As illustrated at FIGS. 11 and 13, the storage panel 250 includes a first set and a second set of horizontal hinge mounting holes 253*h* matched to two sets of horizontal hinge mounting holes 255*h* included on the swing frame 300. The horizontal axis hinge 252 configuration is obtained by fastening one of the hinges 252 to the first set of mount holes 253*h*, 255*h* and the other hinge 252 to the second set of mounting holes 253*h*, 255*h*. To stop the storage panel 250 at the closed position in both the horizontal and vertical axis hinge 252 configurations, a stop plate 254 is provided. As illustrated at FIGS. 3 and 5, the stop plate 254 is fastened to the set of horizontal hinge mounting holes 253*h* farthest from the hinges 252 when the storage panel 250 is in the vertical axis hinge 252 configuration. Similarly, as illustrated at FIGS. 11 and 12, the stop plate 254 is fastened to the set of vertical hinge mounting holes 253*v* farthest from the hinges 252 when the storage panel 250 is in the horizontal axis hinge 252 configuration. A latch 256 is provided on the storage panel 250 to secure the storage panel 250 when in the closed position. To stop the storage panel 250 at the open position in the horizontal hinge 252 configuration, a support member 258 (e.g., a support cable) is provided as shown at FIG. 14. A first end of the support member 258 is attached to the swing frame 300. A second end of the support member 258 is terminated by a ring terminal 260. A hook 262 is provided on the storage panel 250. The ring terminal 260 is preferably attached to the hook 262 when the storage panel 250 is in the horizontal hinge 252 configuration. Other embodiments may provide other means to provide a horizontally and a vertically hinged mount for the storage panel 250. Other embodiments may provide other means for stopping and latching the storage panel 250.

Figure 18:
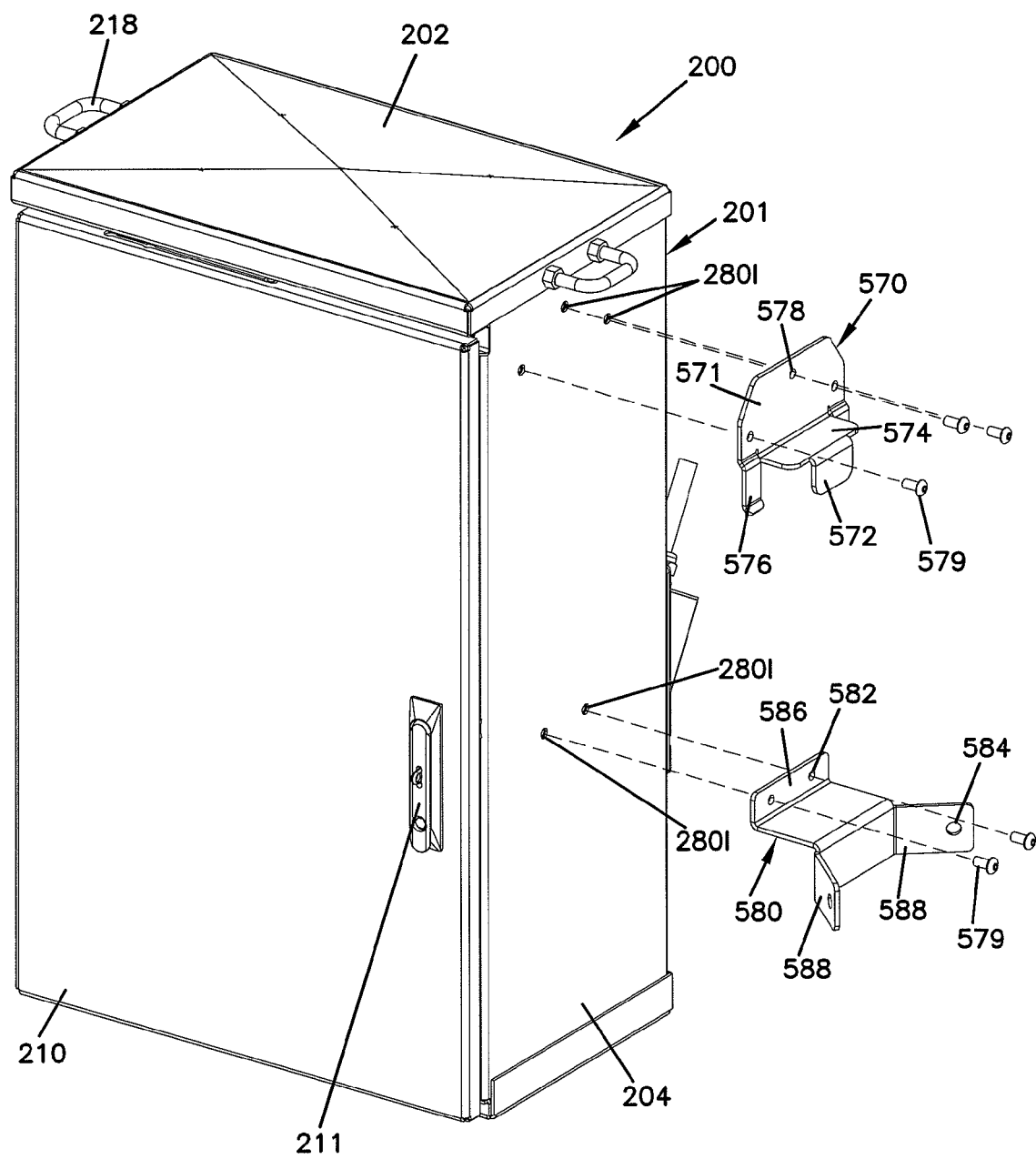
FIG. 18 is a partially exploded perspective view showing the front, top, and left side of the example fiber distribution hub of FIG. 3 and a set of mounting brackets positioned on the left side, wherein the set of mounting brackets has a fixed mounting pole offset.
Figure 19:
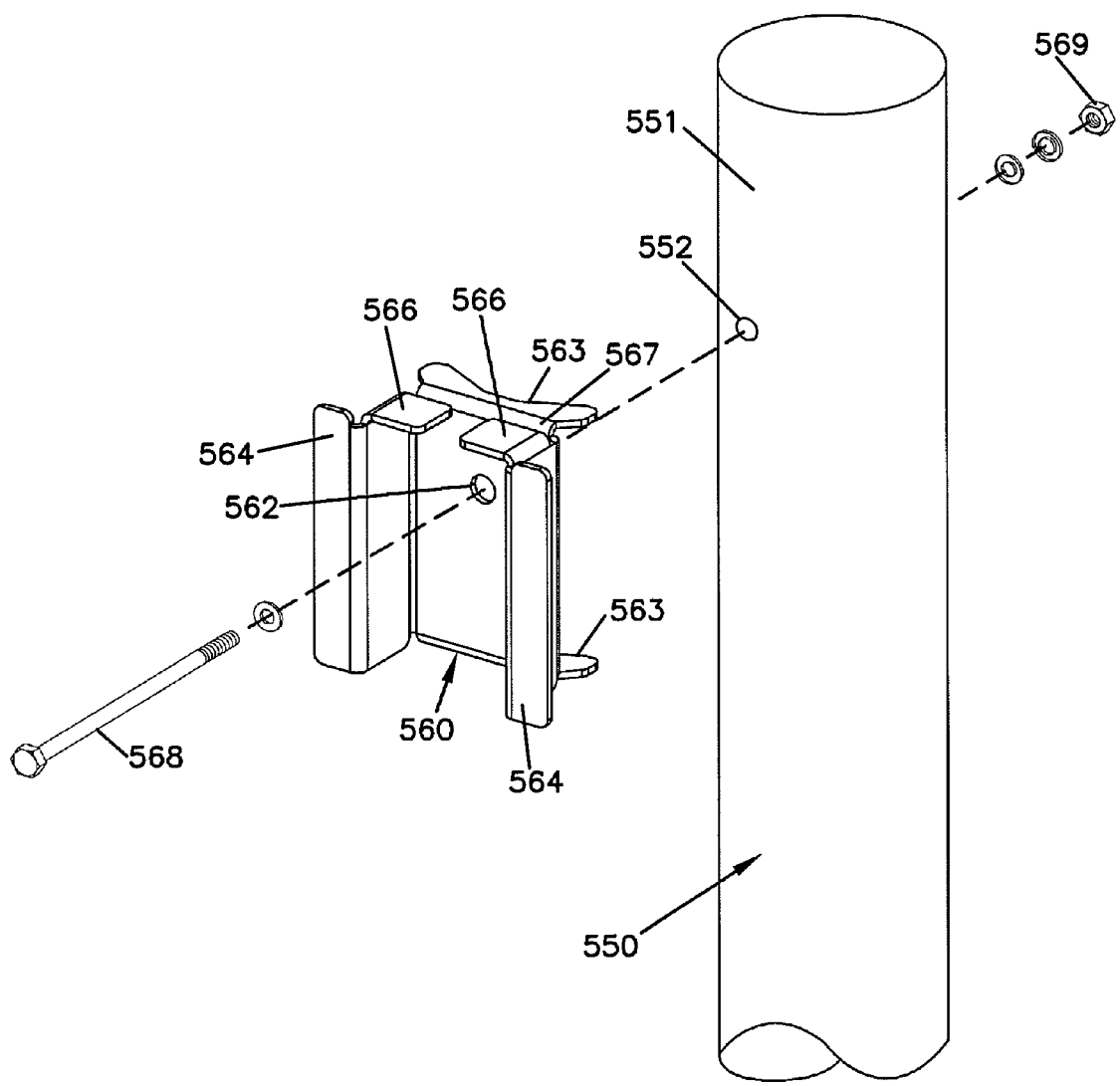
FIG. 19 is an exploded perspective view showing a front, top, and left side of a mounting pole including a mounting pole bracket, wherein the mounting pole bracket has a fixed mounting pole offset.
Figure 20:
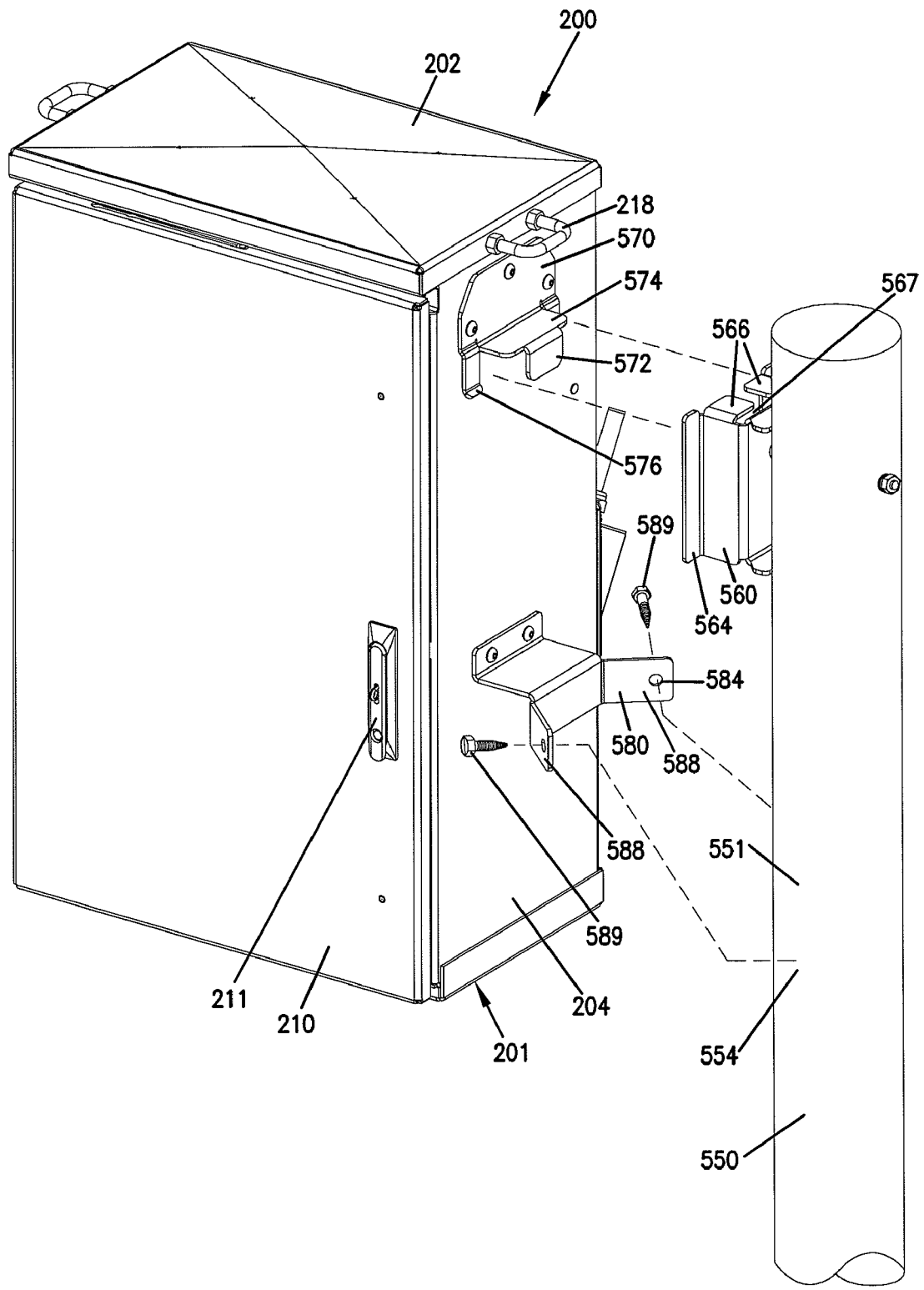
FIG. 20 is a partially exploded perspective view showing the front, top, and left side of the example fiber distribution hub of FIG. 3 with the set of mounting brackets of FIG. 18 installed and mounted to the mounting pole of FIG. 19 in a left mounting configuration position.

Turning now to FIGS. 16 through 20, an example FDH mounting system is illustrated for mounting the FDH 200 to a mounting pole 550 in three configuration positions. The three configuration positions correspond with the three sets of mounting holes 280*b*, 280*l*, and 280*r*, provided on the example FDH cabinet 201 as mentioned above. A clip plate 570 and a bottom bracket 580 are fastened to one of the three sets of mounting holes 280b, 280l, or 280r. If a back panel 205 mounting position is desired, the mounting hole set 280b is used. Likewise, the mounting hole set 280r is used for a right side panel 206 mounting position and mounting hole set 280l is used for a left side panel 204 mounting position. FIGS. 18 and 20 illustrate the left side panel 204 mounting position with the clip plate 570 fastened through mounting holes 578, provided at a mounting flange 571, with mounting fasteners 579 at an upper three of the mounting holes of the set 280l. Additionally, the bottom bracket 580 is fastened through mounting holes 582, provided at a cabinet mounting flange 586, with additional mounting fasteners 579 at a lower two of the mounting holes of the set 280l.

According to the above example FDH mounting system, the mounting pole 550 is prepared to receive the FDH 200 by attaching a pole mounting bracket 560 to the pole 550 as illustrated at FIG. 19. In a preferred embodiment, a thru hole 552 is prepared on the pole 550 and a thru fastener 568 is inserted through a mounting hole 562, provided on the bracket 560, and the thru hole 552. A nut 569 retains the thru fastener 568 and is tightened, drawing an upper and a lower pole cradle 563 of the bracket 560 toward the pole 550. The pole cradles 563 can be concavely shaped to engage an outer surface 551 of the pole 550 thereby preventing rotation of the pole mounting bracket 560. Alternatively, the pole cradles 563 can have other shapes. The pole mounting bracket 560 further includes a pair of clip support flanges 566 and a pair of cabinet support flanges 564 to engage and support the FDH cabinet 201 with the attached clip plate 570, further described below.

FIG. 20 illustrates a mounting method that mounts the FDH 200 to the mounting pole 550. The FDH 200 with the clip plate 570 and the bottom bracket 580 pre-assembled, as described above, may be hung from the mounting pole 550 with the pole mounting bracket 560 pre-assembled, also described above. Hanging the FDH 200 from the mounting pole 550 does not require installing fasteners but instead relies on a clip tab 572 of the clip plate 570 being inserted within a clip slot 567 defined on the pole mounting bracket 560. The clip tab 572 and clip slot 567 act in conjunction with a pair of retaining fingers 576 that engage the cabinet support flanges 564. The retaining fingers 576 may be spring loaded providing a tight, rattle free connection by squeezing the cabinet support flanges 564 against the cabinet 201. In addition, the hanging relies on a pair of pole mounting flanges 588, which form a saddle shape (e.g., a "V" shape) on the bottom bracket 580, engaging the outer surface 551 of the mounting pole 550 and a stop pad 574 on the clip plate 570 engaging a pair of clip support flanges 566 on the pole mounting bracket 560. In particular, the FDH 200 is raised such that the bottom of the attached clip tab 572 is positioned above the clip slot 567 and the outer surface 551 of the mounting pole 550 is nestled within the "V" shape of the pair of the attached pole mounting flanges 588. Such a position is the clip tab 572 engagement position. The "V" shape may radially guide the FDH 200 into a radial engagement position about the mounting pole 550. As mentioned above, the loops 218 are provided to facilitate raising the FDH 200 by a crane. The crane position may be adjusted to move the FDH 200 into a vertical engagement position. A tangential engagement position of the FDH 200 may be obtained with lateral movements of the crane or, if near the clip tab 572 engagement position, manual force may be used. Once the clip tab 572 engagement position has been reached, the FDH 200 is lowered, resulting in the clip tab 572 engaging the clip slot 567. The FDH 200 is further lowered until the stop pad 574 on the clip plate 570 rests against the clip support flanges 566 on the pole mounting bracket 560. Upon the stop pad 574 resting on the clip support flanges 566, the FDH 200 is in a stable hanging position on the mounting pole 550 without additional fasteners. A tipping moment is created by an offset between a center of gravity of the FDH 200 and vertical support at the stop pad 574. The tipping moment is balanced by a lateral support, provided by the clip slot 567, pulling the FDH 200 towards the mounting pole 550 coupled by another lateral support, provided by the mounting pole 550, pushing the FDH 200 away at the bottom bracket 580. The pushing action between the mounting pole 550 and the bottom bracket 580 occurs at the "V" shape of the pair of pole mounting flanges 588, stabilizing the FDH 200. Lowering the FDH 200 into the stable position, without the immediate need for fasteners, simplifies the mounting of the FDH 200 onto the mounting pole 550, as it is difficult to both position the FDH 200 on the mounting pole 550 and simultaneously install fasteners.

After the FDH 200 is hung from the mounting pole 550, as described above, a pair of pole fasteners 589 is inserted through a pair of pole mounting holes 584, provided at the pair of pole mounting flanges 588, and screwed into the mounting pole 550 at a pair of screw locations 554. The pair of pole fasteners 589 prevents the bottom bracket 580 from separating from the mounting pole 550 during disturbances such as a wind storm. In addition, when assembled as described above, the pole mounting fasteners prevent the clip tab 572 from being pulled out of the clip slot 567 and the retaining fingers 576 from being pulled off of the cabinet support flanges 564.

Figure 26:
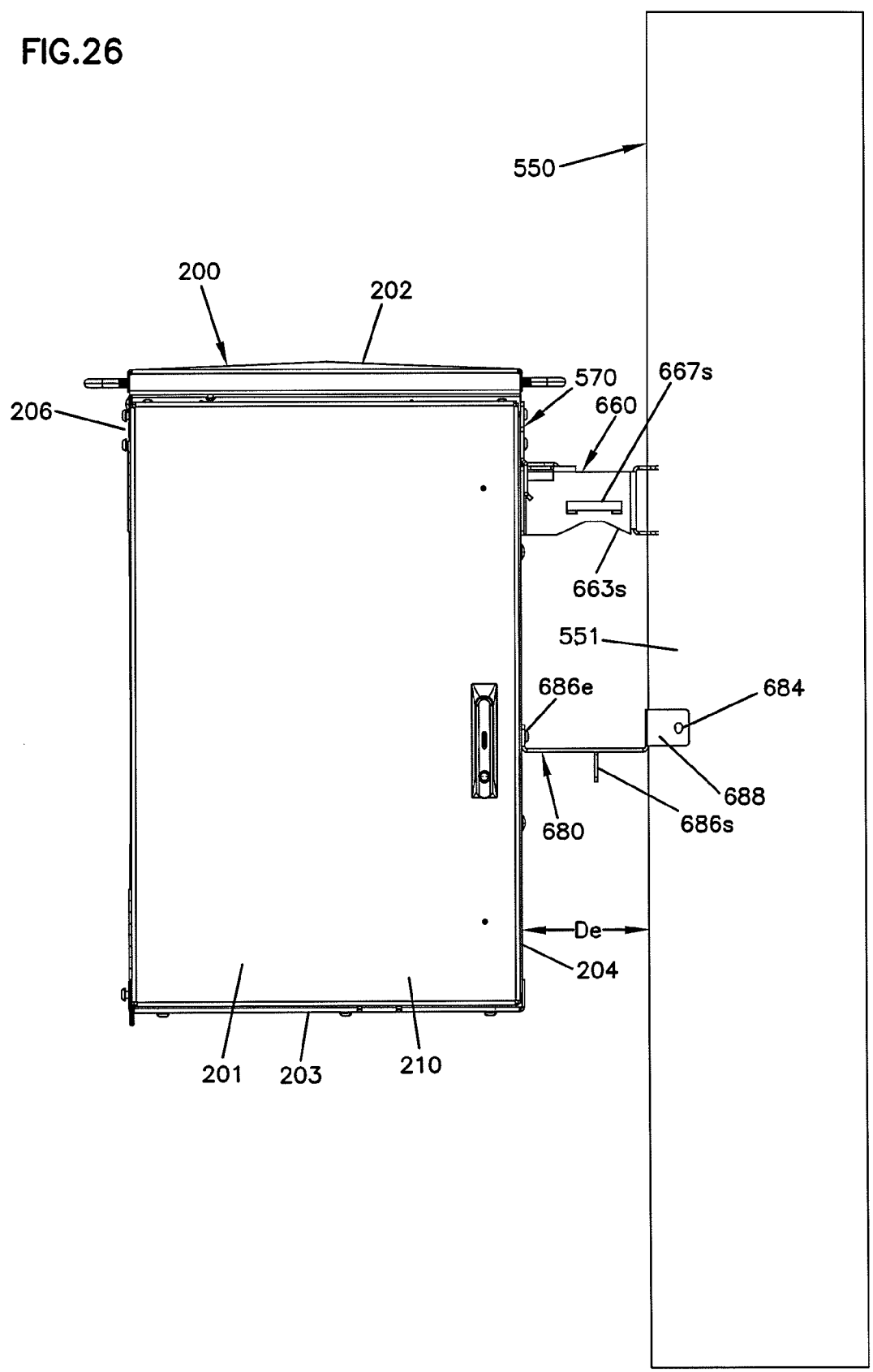
FIG. 26 is a front elevation view of the example fiber distribution hub of FIG. 3 with the set of rearrangeable mounting brackets of FIG. 22 installed and mounted to the mounting pole of FIG. 19 in the left mounting configuration position, wherein the set of rearrangeable mounting brackets is arranged for the extended mounting pole offset.
Figure 27:
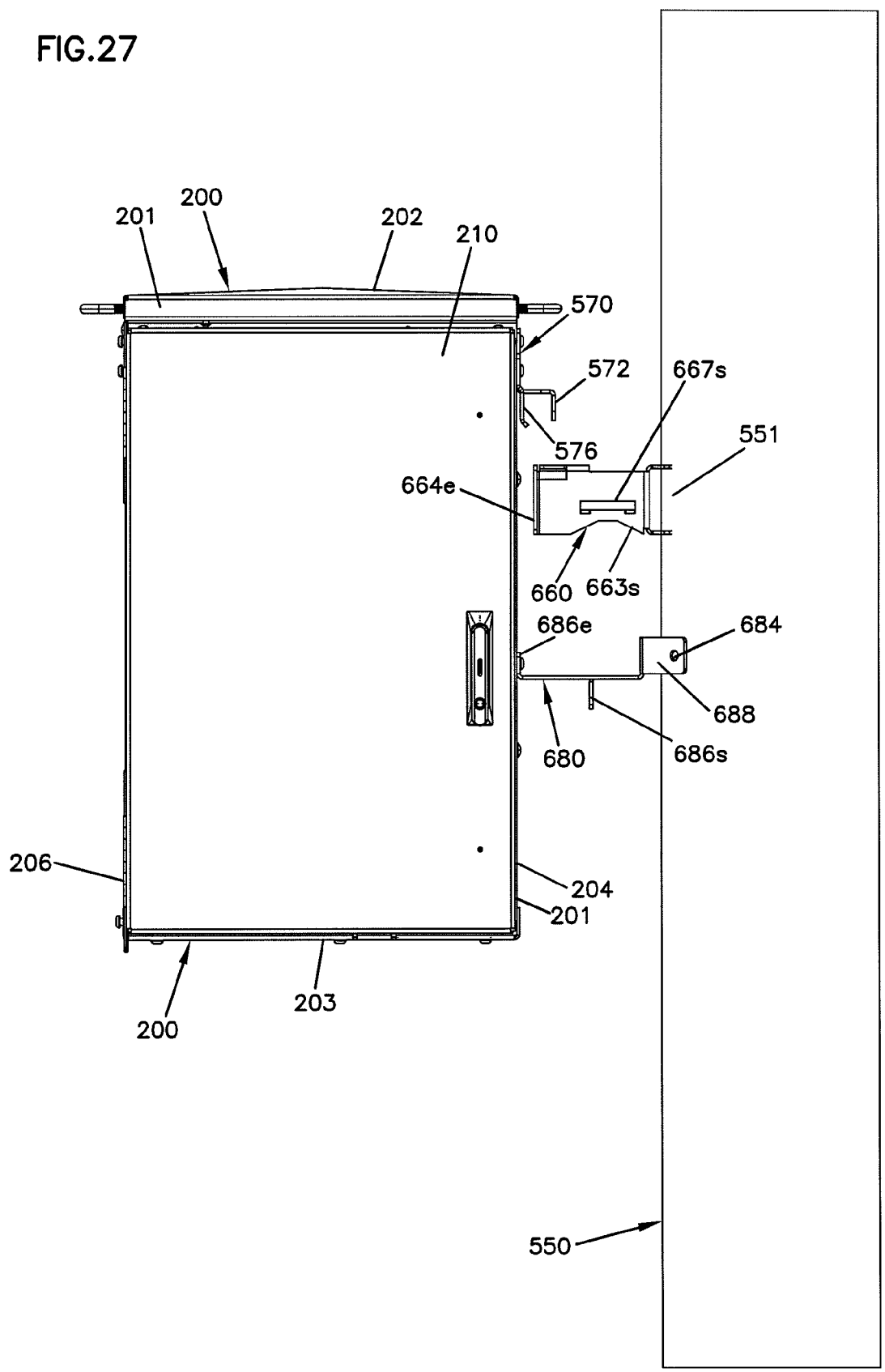
FIG. 27 is a front elevation view similar to FIG. 26 but with the fiber distribution hub and the two connected mounting brackets separated from the mounting pole and the connected mounting pole bracket.
Figure 32:
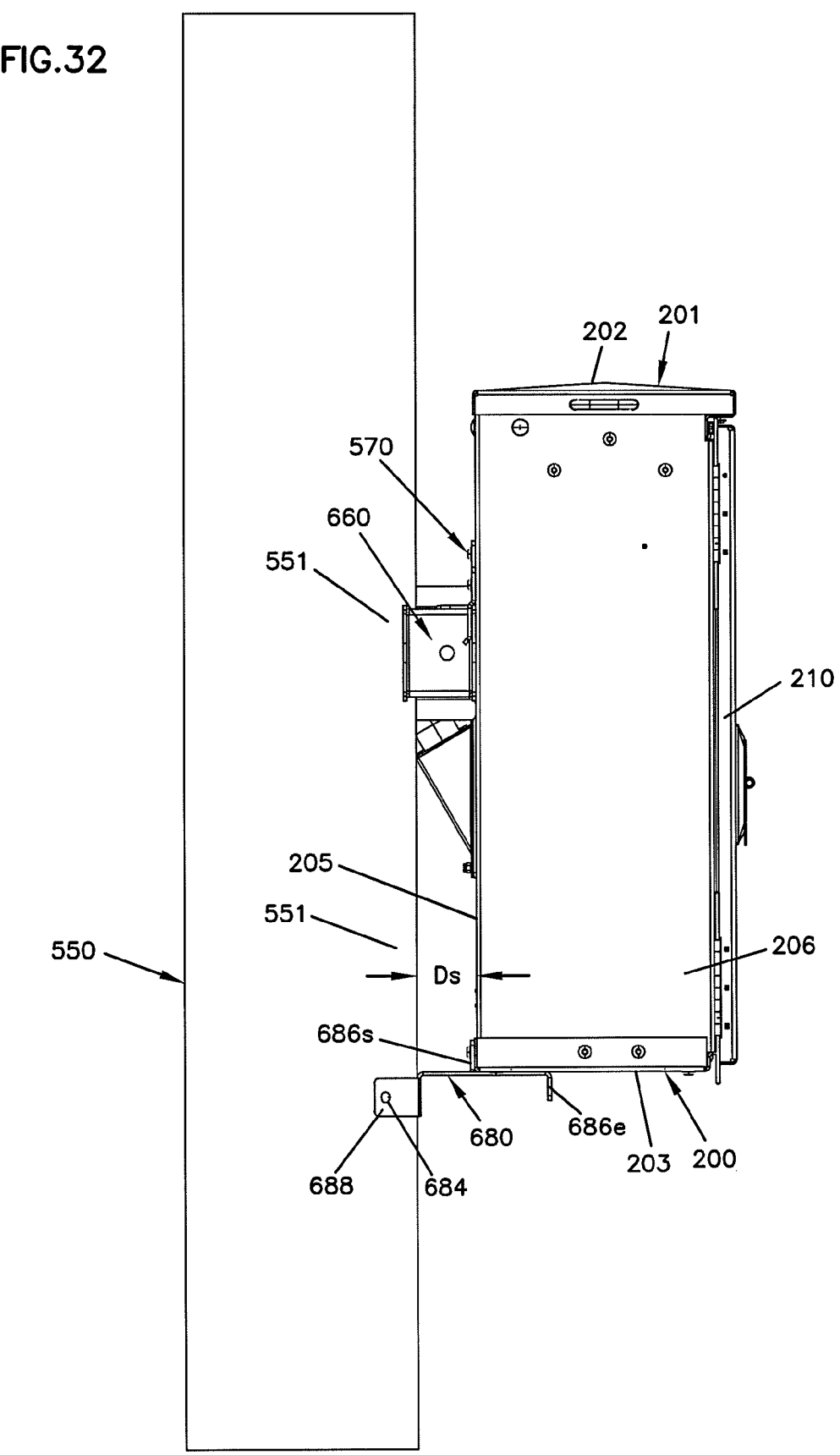
FIG. 32 is a right side elevation view of the example fiber distribution hub of FIG. 3 with the set of rearrangeable mounting brackets of FIG. 22 installed and mounted to the mounting pole of FIG. 19 in the rear mounting configuration position, wherein the set of rearrangeable mounting brackets is arranged for the short mounting pole offset.
Figure 33:
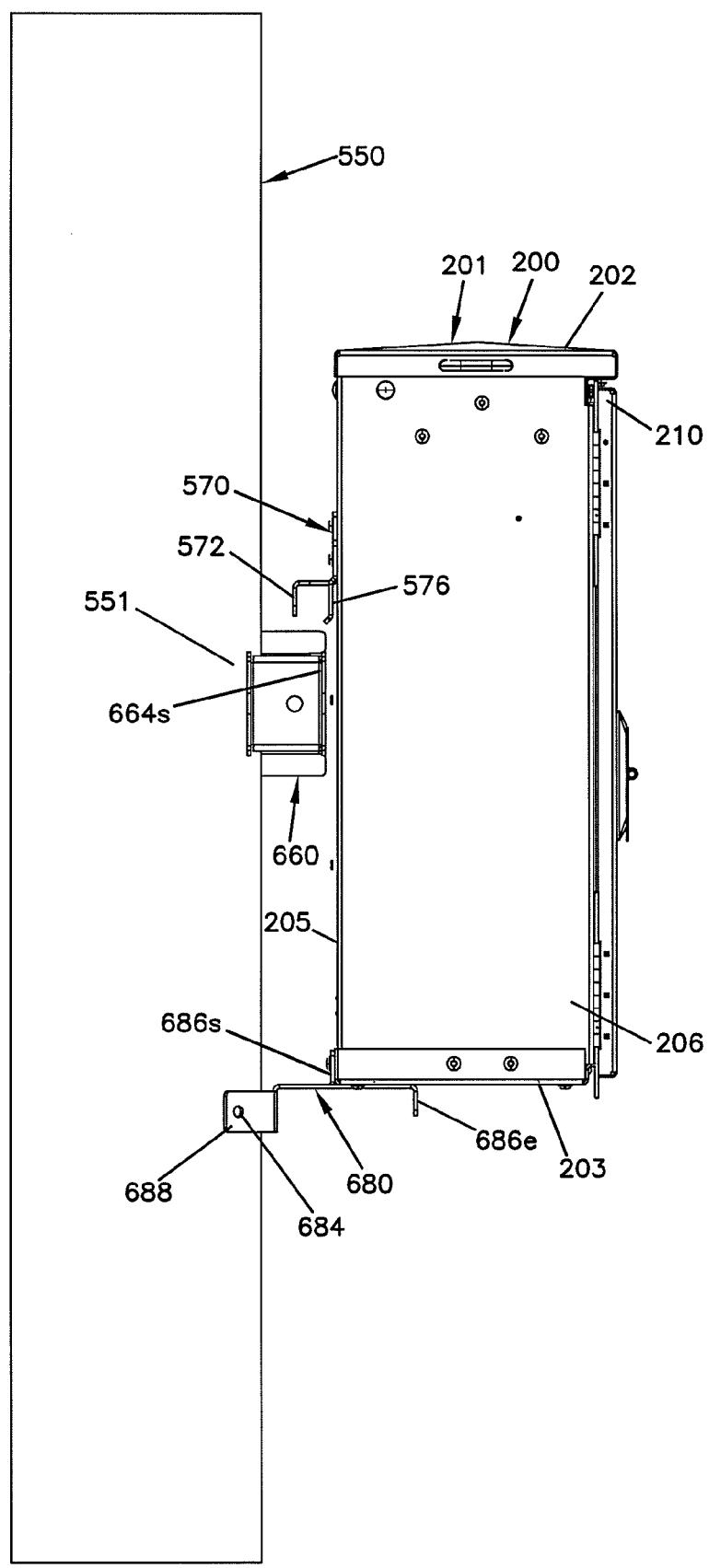
FIG. 33 is a right side elevation view similar to FIG. 32 but with the fiber distribution hub and the two connected mounting brackets separated from the mounting pole and the connected mounting pole bracket (in addition, a fiber entry/exit cover and related fiber cables have been removed for ease of viewing).

In the above embodiment, the example FDH mounting system is configured to hold the example FDH cabinet 201 offset from the mounting pole 550 at a given distance. In the above example, the offset distance is a fixed distance determined, in part, by the clip plate 570, the pole mounting bracket 560, and the bottom bracket 580. In an embodiment further described and illustrated below, the offset distance can be selected between an extended distance De (see FIG. 26) and a short distance Ds (see FIG. 32). The distances De and Ds are determined, in part, by the clip plate 570, a pole mounting bracket 660, and a bottom bracket 680.

Figure 22:
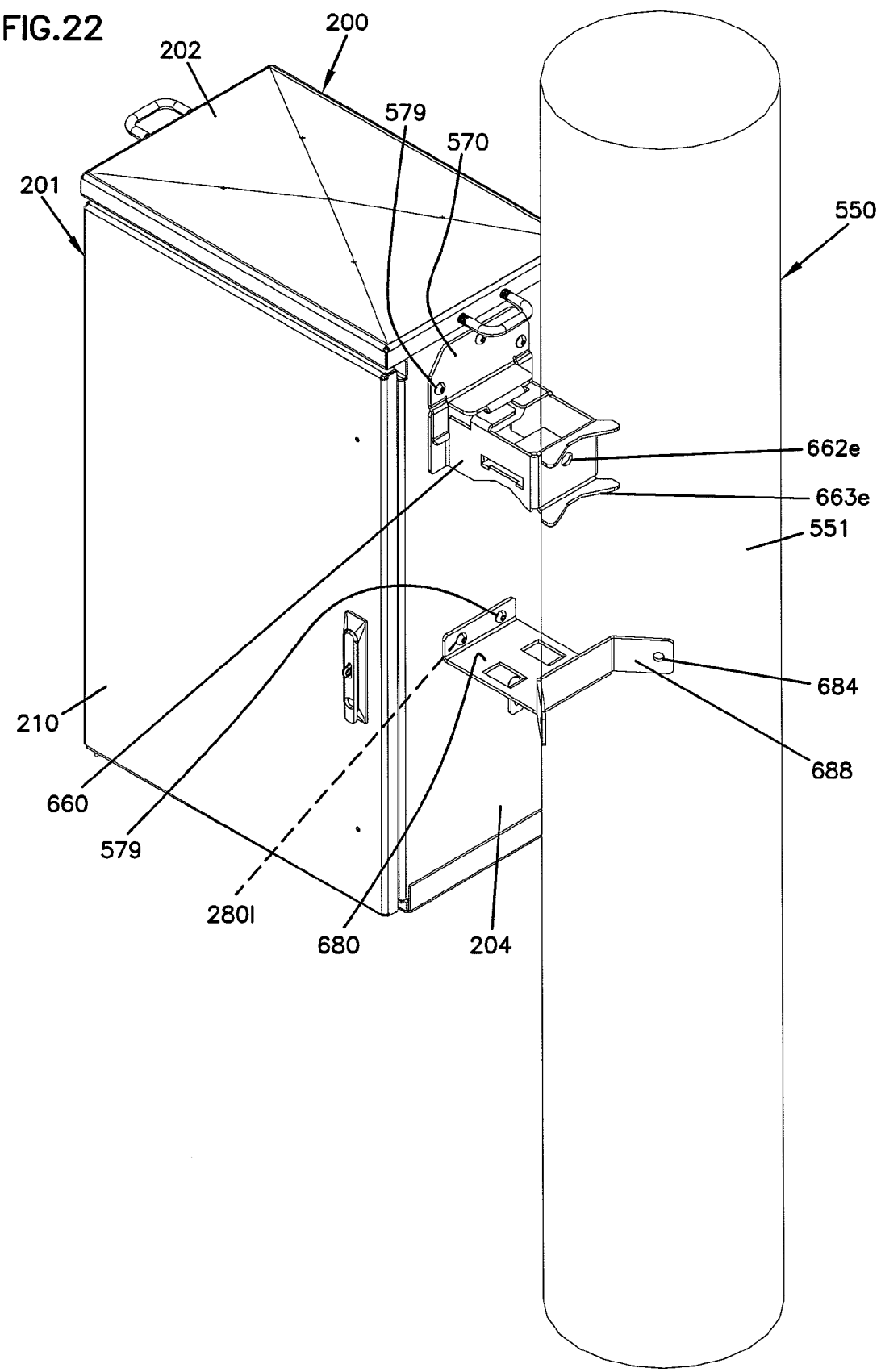
FIG. 22 is a perspective view showing the front, top, and left side of the example fiber distribution hub of FIG. 3 with a set of rearrangeable mounting brackets installed and mounted to the mounting pole of FIG. 19 in the left mounting configuration position, wherein the set of rearrangeable mounting brackets is arranged for an extended mounting pole offset (the fiber distribution hub and mounting pole are shown transparent over the brackets)

As illustrated at FIGS. 22 through 27, a first arrangement of the clip plate 570, a pole mounting bracket 660, and a bottom bracket 680 results in the extended offset distance De. In a preferred embodiment, the distance De is between 6.5 and 7.5 inches. In another embodiment, the distance De is between 6.5 and 9 inches. In yet another embodiment, the distance De is between 5 and 7.5 inches. In other embodiments, the distance De can be any length. Embodiments with the extended offset distance De are typically used when mounting the FDH cabinet 201 on its side (e.g., on the left side panel 204 or the right side panel 206) as shown at FIG. 22. Such extended configurations are beneficial in that they can provide desired positioning for the FDH cabinet 201 with respect to ladders and pole steps.

Figure 28:
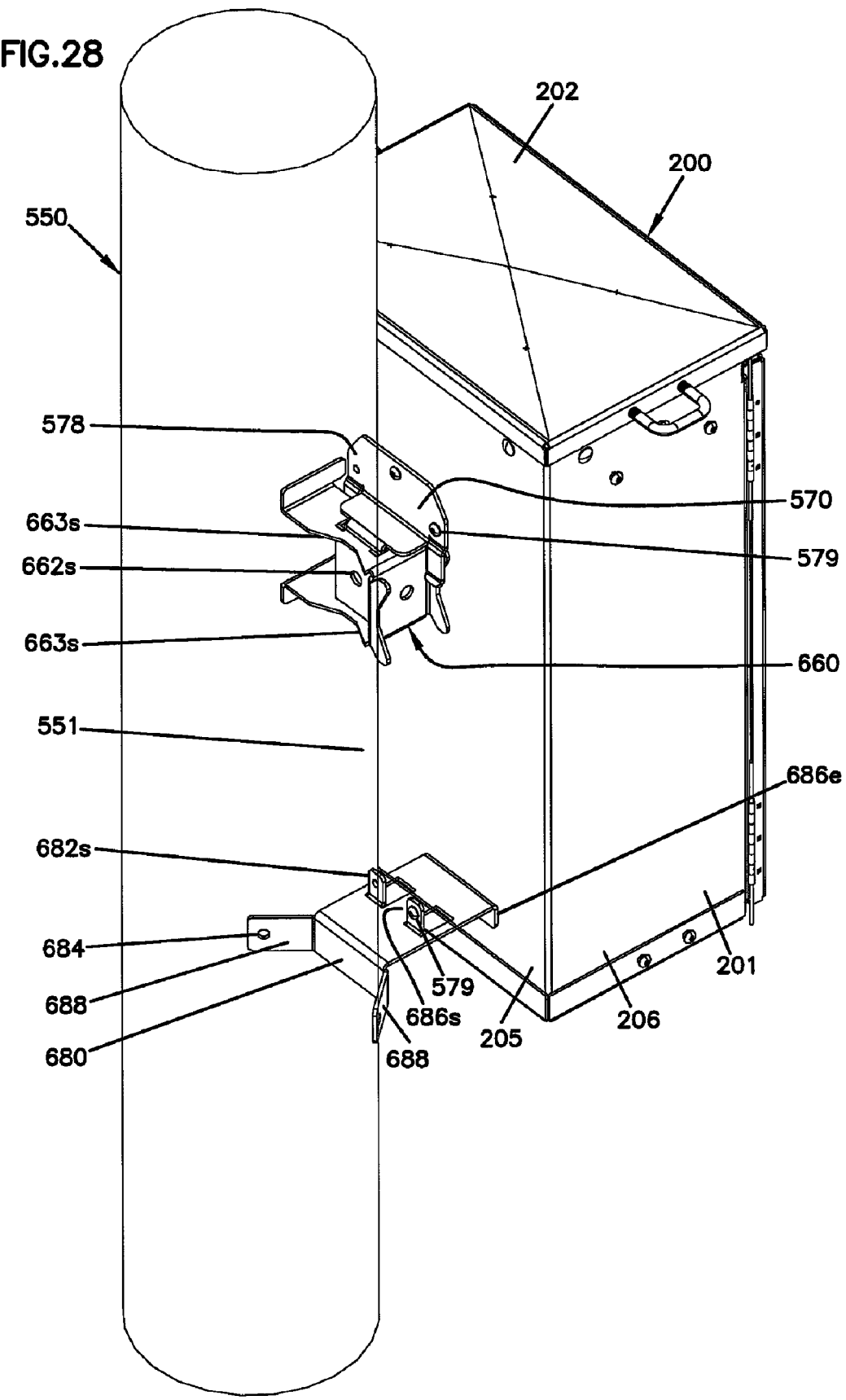
FIG. 28 is a perspective view showing the rear, top, and right side of the example fiber distribution hub of FIG. 3 with the set of rearrangeable mounting brackets of FIG. 22 installed and mounted to the mounting pole of FIG. 19 in a rear mounting configuration position, wherein the set of rearrangeable mounting brackets is arranged for a short mounting pole offset (the fiber distribution hub and mounting pole are shown transparent over the brackets)

Likewise, as illustrated at FIGS. 28 through 33, a second arrangement of the clip plate 570, the pole mounting bracket 660, and the bottom bracket 680 results in the short offset distance Ds. In a preferred embodiment, the distance Ds is between 2.5 and 3.5 inches. In another embodiment, the distance Ds is between 1 and 3.5 inches. In yet another embodiment, the distance Ds is between 2.5 and 5 inches. In other embodiments, the distance Ds can be any length. Embodiments with the short offset distance Ds are typically used when the second arrangement suits available FDH mounting space. Such short configurations can also provide high support strength and/or are used when mounting the FDH cabinet 201 on its back (e.g., on the back panel 205) as shown at FIG. 28. Many similarities exist between the example fixed offset FDH mounting system of FIGS. 18-20 and the example selectable offset FDH mounting system illustrated and described below.

As in the fixed offset FDH mounting system example, the selectable offset FDH mounting system example can mount the example FDH 200 to the mounting pole 550 in three configuration positions. The three configuration positions correspond with the three sets of mounting holes 280b, 280l, and 280r, provided on the example FDH cabinet 201, as mentioned above. The clip plate 570 and the bottom bracket 680 are fastened to one of the three sets of mounting holes 280b, 280l, or 280r. The mounting position on the FDH cabinet 201 is thereby selectable, as further described above. FIGS. 22 through 27 illustrate the left side panel 204 mounting position with the clip plate 570 and bottom bracket 680 fastened to the FDH cabinet 201 at the mounting holes 280l. FIGS. 28 through 33 illustrate the back panel 205 mounting position with the clip plate 570 and bottom bracket 680 fastened to the FDH cabinet 201 at the mounting holes 280b.

Figure 31:
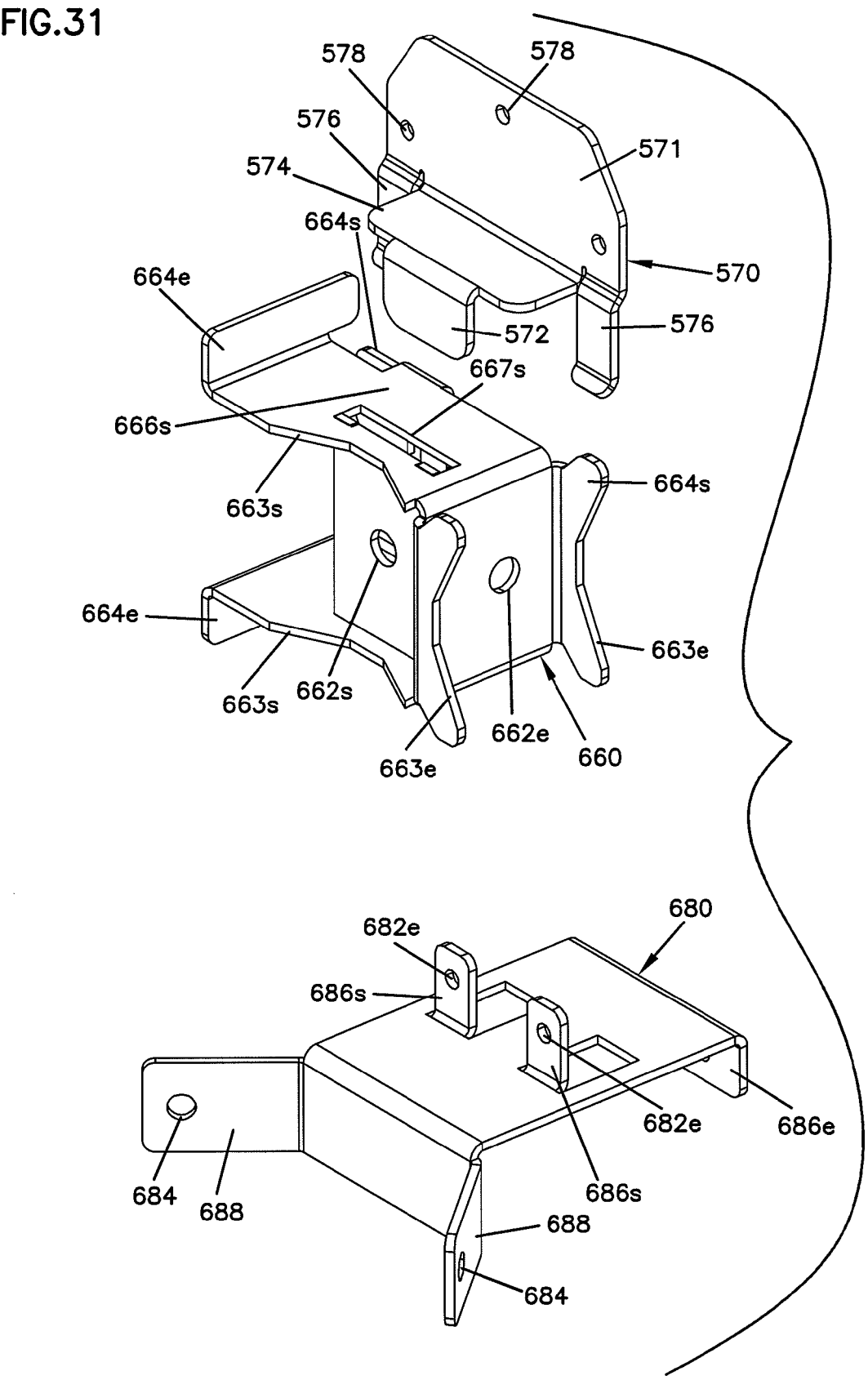
FIG. 31 is an enlarged perspective view similar to FIG. 29 but showing only the separated set of rearrangeable mounting brackets arranged for the short mounting pole offset.

The bottom bracket 680 includes two sets of mounting holes 682e (see FIG. 25) and 682s (see FIG. 31). The mounting holes 682e, included on mounting flange 686e, are fastened to the lower pair of mounting holes 280b, 280l, or 280r of the FDH cabinet 201 when the extended offset distance De (see FIG. 26) is selected. Likewise, the mounting holes 682s, included on mounting flanges 686s, are fastened to the lower pair of mounting holes 280b, 280l, or 280r of the FDH cabinet 201 when the short offset distance Ds (see FIG. 32) is selected. As illustrated at FIGS. 22 and 28, the bottom bracket 680 is flipped depending on which of the mounting holes 682e or 682s and corresponding mounting flanges 686e or 686s are used.

The pole mounting bracket 660 includes two mounting holes 662e (see FIG. 25) and 662s (see FIG. 31). The mounting hole 662e is used when the extended offset distance De (see FIG. 26) is selected. Likewise, the mounting hole 662s is used when the short offset distance Ds (see FIG. 32) is selected. As in the fixed offset FDH mounting system example, the mounting pole 550 is prepared to receive the FDH 200 by attaching the pole mounting bracket 660 to the pole 550 as illustrated at FIGS. 22 and 28. In a preferred embodiment, the thru hole 552 is prepared on the pole 550 and the thru fastener 568 is inserted through the thru hole 552 and either the mounting hole 662e or the mounting hole 662s, provided on the bracket 660 (see FIG. 19 for a related illustration).

The pole mounting bracket 660 includes two pairs of pole cradles 663e (see FIG. 25) and 663s (see FIG. 31). The pole cradle 663e is used together with the mounting hole 662e when the extended offset distance De (see FIG. 26) is selected. Likewise, the pole cradle 663s is used together with the mounting hole 662s when the short offset distance Ds (see FIG. 32) is selected. The nut 569 retains the thru fastener 568 and is tightened, drawing the upper and the lower pole cradle 663e or 663s of the bracket 660 toward the pole 550. The pole cradles 663e and 663s can be concavely shaped to engage the outer surface 551 of the pole 550 thereby preventing rotation of the pole mounting bracket 660. Alternatively, the pole cradles 663e and 663s can have other shapes.

The pole mounting bracket 660 further includes two sets of clip support flanges 666e (see FIG. 25) and 666s (see FIG. 31). The clip support flanges 666e are used together with the mounting hole 662e when the extended offset distance De (see FIG. 26) is selected. Likewise, the clip support flange 666s is used together with the mounting hole 662s when the short offset distance Ds (see FIG. 32) is selected.

The pole mounting bracket 660 further includes two pairs of cabinet support flanges 664e (see FIG. 25) and 664s (see FIG. 31). The clip support flanges 664e are used together with the mounting hole 662e when the extended offset distance De (see FIG. 26) is selected. Likewise, the cabinet support flanges 664s are used together with the mounting hole 662s when the short offset distance Ds (see FIG. 32) is selected. The pair of cabinet support flanges 664e or 664s engage and support the FDH cabinet 201 at the attached clip plate 570, further described below.

The pole mounting bracket 660 further includes two clip slots 667e (see FIG. 25) and 667s (see FIG. 31). The clip slot 667e is used together with the mounting hole 662e when the extended offset distance De (see FIG. 26) is selected. Likewise, the clip slot 667s is used together with the mounting hole 662s when the short offset distance Ds (see FIG. 32) is selected.

Figure 23:
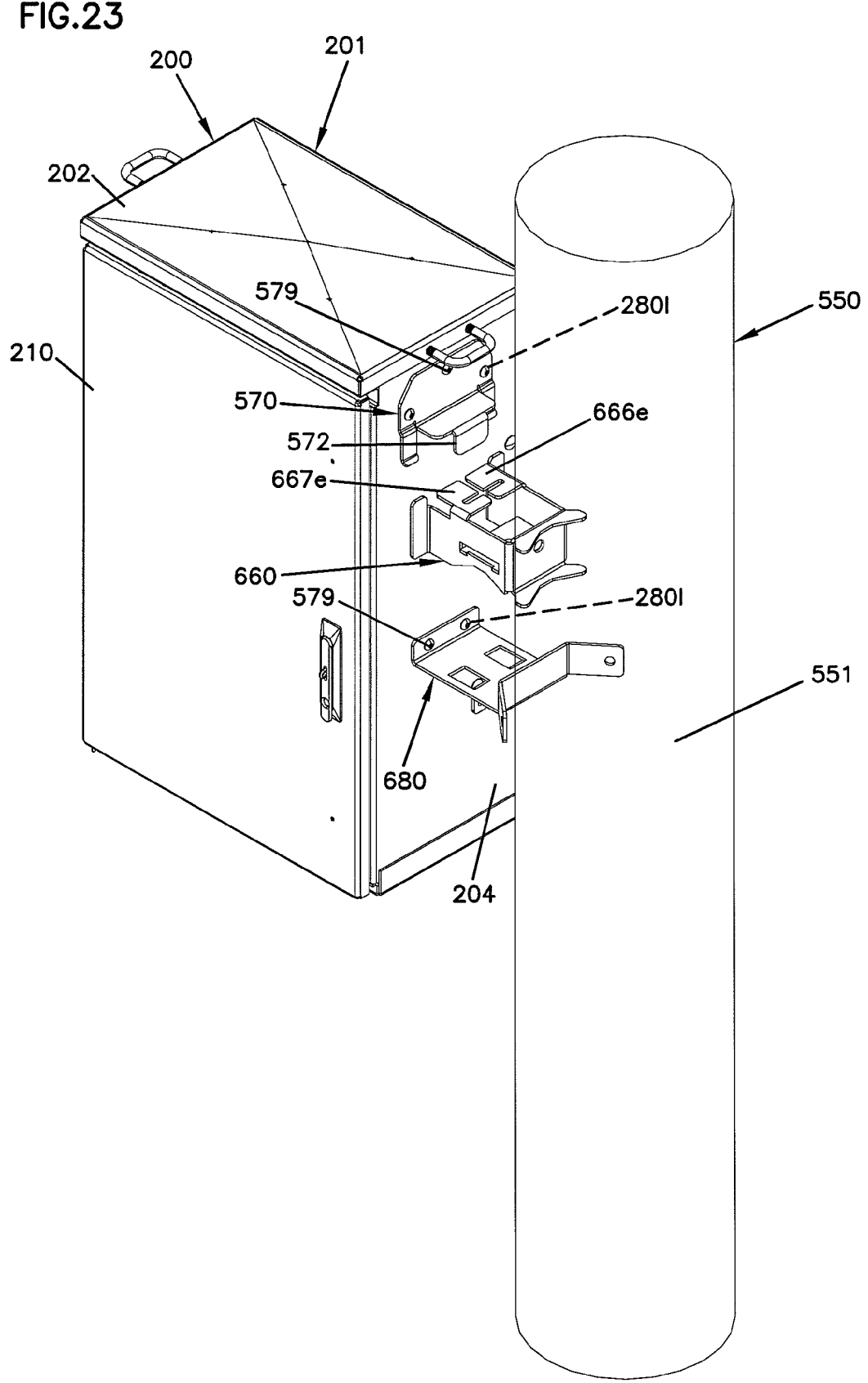
FIG. 23 is a perspective view similar to FIG. 22 but with the fiber distribution hub and two connected mounting brackets separated from the mounting pole and a connected mounting pole bracket.
Figure 24:
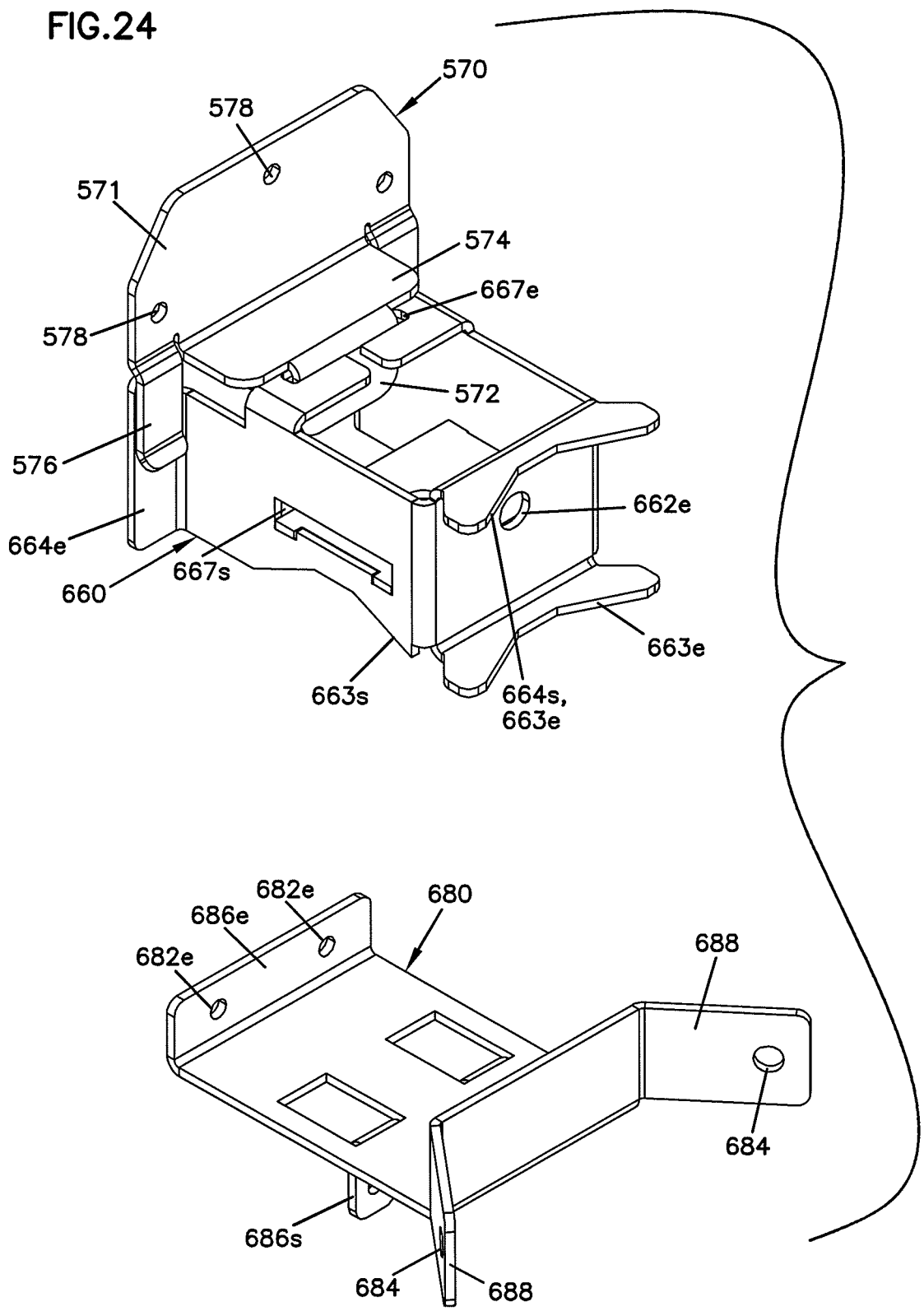
FIG. 24 is an enlarged perspective view similar to FIG. 22 but showing only the set of rearrangeable mounting brackets arranged for the extended mounting pole offset.
Figure 25:
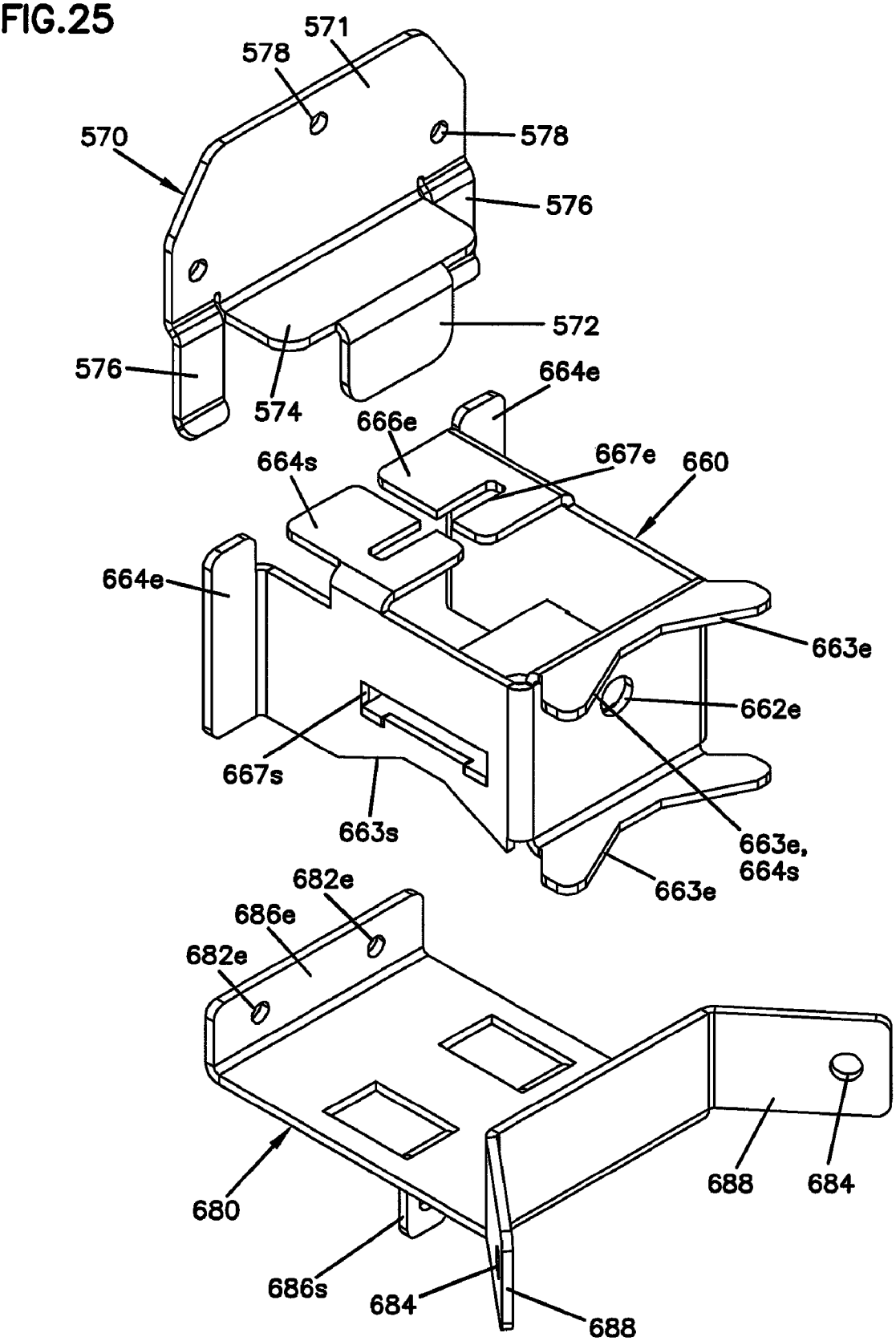
FIG. 25 is an enlarged perspective view similar to FIG. 23 but showing only the separated set of rearrangeable mounting brackets arranged for the extended mounting pole offset.
Figure 29:
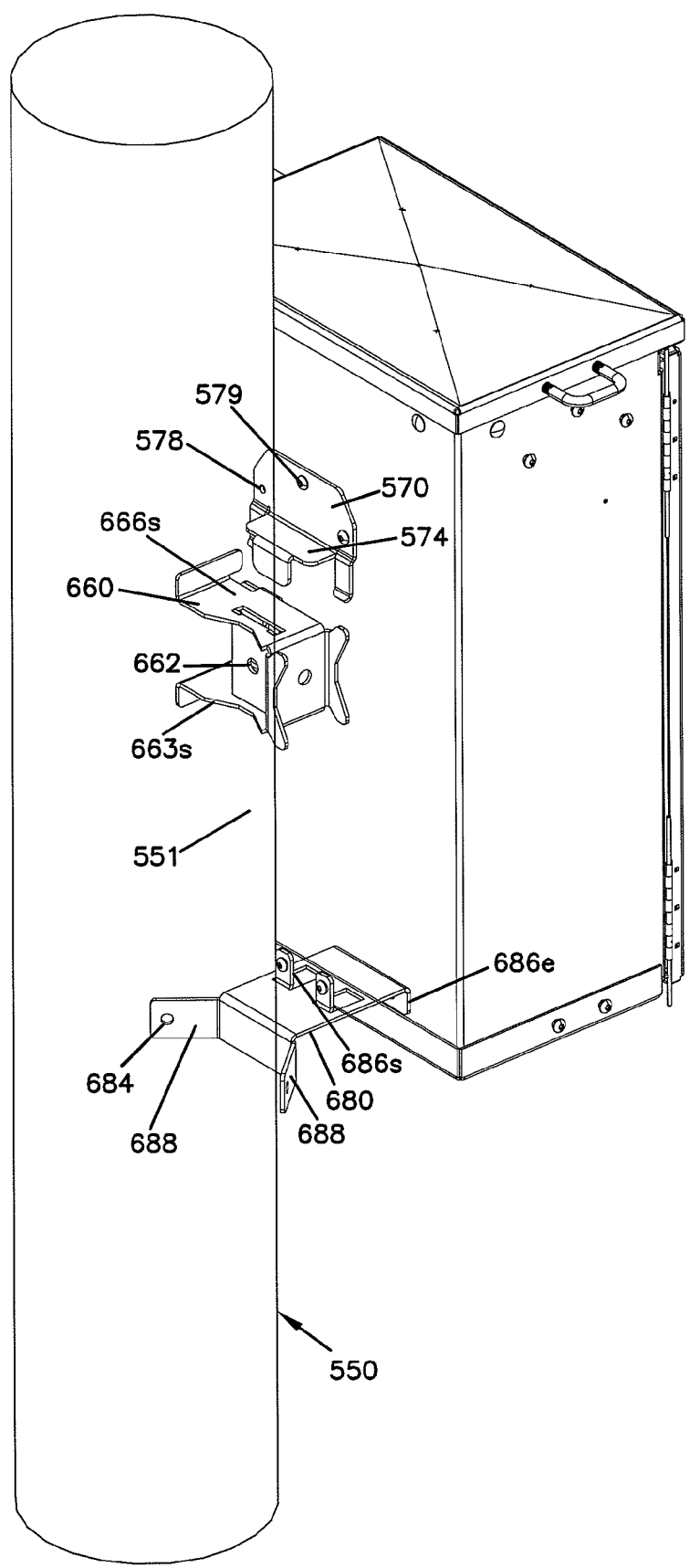
FIG. 29 is a perspective view similar to FIG. 28 but with the fiber distribution hub and the two connected mounting brackets separated from the mounting pole and the connected mounting pole bracket.
Figure 30:
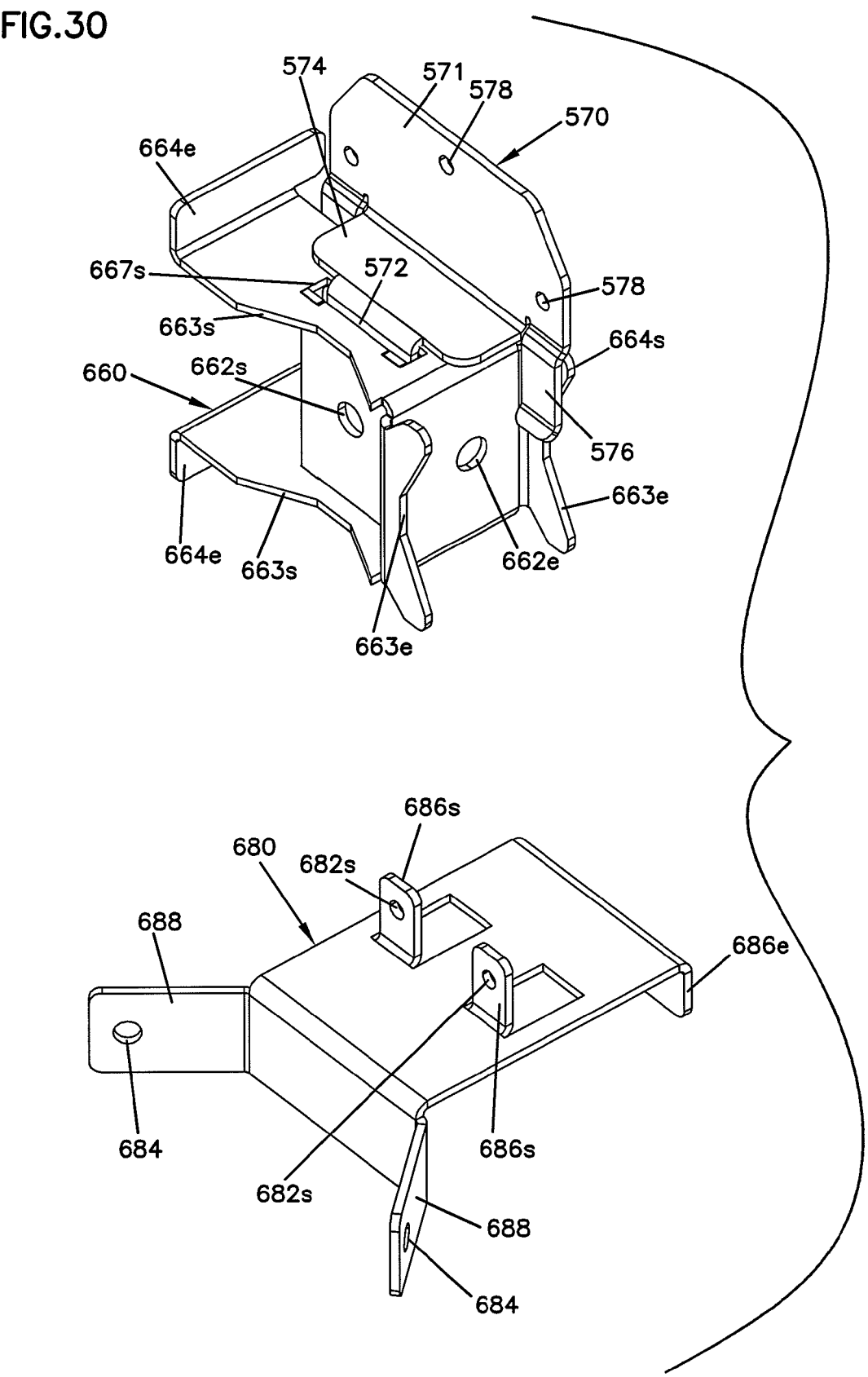
FIG. 30 is an enlarged perspective view similar to FIG. 28 but showing only the set of rearrangeable mounting brackets arranged for the short mounting pole offset.

FIGS. 23 and 29 illustrate a mounting method that mounts the FDH 200 to the mounting pole 550. The FDH 200 with the clip plate 570 and the bottom bracket 680 pre-assembled, as described above, may be hung from the mounting pole 550 with the pole mounting bracket 660 pre-assembled, also described above. Preferably, both the bottom bracket 680 and the pole mounting bracket 660 are mounted in a compatible configuration (e.g., both are configured for either the extended offset distance De or the short offset distance Ds). As in the fixed offset FDH mounting system example, hanging the FDH 200 from the mounting pole 550 does not require installing fasteners but instead relies on the clip tab 572 of the clip plate 570 being inserted within the clip slot 667e or 667s defined on the pole mounting bracket 660. The clip tab 572 and clip slot 667e or 667s act in conjunction with a pair of retaining fingers 576 that engage the cabinet support flanges 664e or 664s. The retaining fingers 576 may be spring loaded providing a tight, rattle free connection by squeezing the cabinet support flanges 664e or 664s against the cabinet 201. In addition, the hanging relies on a pair of pole mounting flanges 688, which form a saddle shape (e.g., a "V" shape) on the bottom bracket 680, engaging the outer surface 551 of the mounting pole 550 and a stop pad 574 on the clip plate 570 engaging the clip support flanges 666e or 666s on the pole mounting bracket 660. In particular, the FDH 200 is raised such that the bottom of the attached clip tab 572 is positioned above the clip slot 667e or 667s and the outer surface 551 of the mounting pole 550 is nestled within the "V" shape of the pair of the attached pole mounting flanges 688. Such a position is the clip tab 572 engagement position. The "V" shape may radially guide the FDH 200 into a radial engagement position about the mounting pole 550. The FDH 200 may be maneuvered as described above in the fixed offset FDH mounting system example.

Once the clip tab 572 engagement position has been reached, the FDH 200 is lowered, resulting in the clip tab 572 engaging the clip slot 667e or 667s. The FDH 200 is further lowered until the stop pad 574 on the clip plate 570 rests against the clip support flanges 666e or 666s on the pole mounting bracket 660. Upon the stop pad 574 resting on the clip support flanges 666e or 666s, the FDH 200 is in a stable hanging position on the mounting pole 550 without additional fasteners. The stability provided the FDH 200 in the current example is similar to that provided in the fixed offset FDH mounting system example described above.

Lowering the FDH 200 into the stable position, without the immediate need for fasteners, simplifies the mounting of the FDH 200 onto the mounting pole 550, as it is difficult to both position the FDH 200 on the mounting pole 550 and simultaneously install fasteners.

As in the fixed offset FDH mounting system example, after the FDH 200 is hung from the mounting pole 550, as described above, a pair of pole fasteners 589 is inserted through a pair of pole mounting holes 684, provided at the pair of pole mounting flanges 688, and screwed into the mounting pole 550 at a pair of screw locations 554 (see FIG. 20 for a related illustration). The pair of pole fasteners 589 prevents the bottom bracket 680 from separating from the mounting pole 550 during disturbances such as a wind storm. In addition, when assembled as described above, the pole mounting fasteners prevent the clip tab 572 from being pulled out of the clip slot 667*e* or 667*s* and the retaining fingers 576 from being pulled off of the cabinet support flanges 664*e* or 664*s*.

As described above, the example selectable offset FDH mounting system provides the benefit of two selectable offset distances De or Ds utilizing the same set of mounting brackets 570, 660, and 680. This selectability further enhances the ability to tailor the FDH 200 to a given application.

The above specification provides examples of how certain inventive aspects may be put into practice. It will be appreciated that the inventive aspects may be practiced in other ways than those specifically shown and described herein without departing from the spirit and scope of the inventive aspects.

What is claimed is:

1. A fiber distribution hub mountable on a mounting pole comprising:
  a cabinet with a first side, the cabinet including at least one door mounted on the first side;
  an entrance location on the cabinet for a fiber optic feeder cable;
  a fiber termination region located within the cabinet; and
  a multi-configuration mounting bracket for mounting the cabinet on the mounting pole;
  wherein the multi-configuration mounting bracket can be configured to mount the cabinet on the mounting pole in a first mounting configuration with a first offset between the mounting pole and the cabinet or a second mounting configuration with a second offset between the mounting pole and the cabinet; and
  wherein the mounting bracket includes a first pole cradle and a second pole cradle, the first mounting configuration having the first pole cradle of the mounting bracket adjacent the mounting pole and the second mounting configuration having the second pole cradle of the mounting bracket adjacent the mounting pole when the cabinet is mounted to the mounting pole.

2. The fiber distribution hub of claim 1, wherein mounting the cabinet in the first mounting configuration positions the cabinet farther from the mounting pole than mounting the cabinet in the second mounting configuration.

3. The fiber distribution hub of claim 1, wherein the first and the second pole cradles are concavely shaped.

4. The fiber distribution hub of claim 1, further comprising a hinged storage panel rotatably mounted within the cabinet, the hinged storage panel including a storage module parking space.

5. A fiber distribution hub mountable on a mounting pole comprising:
  a cabinet with a first side, the cabinet including at least one door mounted on the first side;
  an entrance location on the cabinet for a fiber optic feeder cable;
  a fiber termination region located within the cabinet; and
  a multi-configuration mounting bracket for mounting the cabinet on the mounting pole;
  wherein the multi-configuration mounting bracket can be configured to mount the cabinet on the mounting pole in a first mounting configuration with a first offset between the mounting pole and the cabinet or a second mounting configuration with a second offset between the mounting pole and the cabinet; and
  wherein the mounting bracket includes a first pole cradle, a second pole cradle, a first mounting slot and a second mounting slot, the mounting bracket pre-mountable to the mounting pole with the first pole cradle or the second pole cradle adjacent the mounting pole, the first mounting slot supporting the cabinet and the first pole cradle mounted to the mounting pole when the cabinet is mounted in the first mounting configuration, and the second mounting slot supporting the cabinet and the second pole cradle mounted to the mounting pole when the cabinet is mounted in the second mounting configuration.

6. The fiber distribution hub of claim 5, wherein a tab is attached to the cabinet, the tab engaging the first mounting slot of the mounting bracket when the cabinet is mounted in the first mounting configuration and the tab engaging the second mounting slot of the mounting bracket when the cabinet is mounted in the second mounting configuration.

7. The fiber distribution hub of claim 6, wherein the cabinet further includes a second side and a third side, the tab being attachable to the cabinet on either the second side or the third side, the multi-configuration mounting bracket engaging the tab in either the first or the second mounting configurations when the tab is attached to the second side, and the multi-configuration mounting bracket also engaging the tab in either the first or the second mounting configurations when the tab is attached to the third side of the cabinet.

8. The fiber distribution hub of claim 5, wherein mounting the cabinet in the first mounting configuration positions the cabinet farther from the mounting pole than mounting the cabinet in the second mounting configuration.

9. The fiber distribution hub of claim 5, further comprising a hinged storage panel rotatably mounted within the cabinet, the hinged storage panel including a storage module parking space.

10. A fiber distribution hub mountable on a mounting pole comprising:
  a cabinet with a first side, a second side, a third side, and a fourth side, the cabinet including at least one door mounted on the first side and the cabinet including a first exterior panel on the second side;
  an entrance location on the cabinet for a fiber optic feeder cable;
  a fiber termination region positioned within the cabinet; and
  a mounting bracket set including a first part and a second part, the first part of the mounting bracket set attachable to the cabinet, the second part of the mounting bracket set attachable to the mounting pole;
  wherein the first part and the second part of the mounting bracket set can connect with each other in either a first bracket configuration or a second bracket configuration;
  wherein the cabinet is mounted closer to the mounting pole when the mounting bracket set is in the first bracket configuration as compared to when the mounting bracket set is in the second bracket configuration; and
  wherein the cabinet further includes a second exterior panel on the third side, the first part of the mounting bracket set also attachable to the second exterior panel, wherein the mounting bracket set can mount the second side of the cabinet to the mounting pole in either the first or the second bracket configurations, and wherein the mounting bracket set can mount the third side of the cabinet to the mounting pole in either the first or the second bracket configurations.

11. The fiber distribution hub of claim 10, wherein the first exterior panel of the cabinet includes a first group of mounting holes and the second exterior panel of the cabinet includes a second group of mounting holes, wherein the mounting bracket set attaches to the first group of mounting holes when the second side of the cabinet is mounted to the mounting pole, and wherein the mounting bracket set attaches to the second group of mounting holes when the third side of the cabinet is mounted to the mounting pole.

12. The fiber distribution hub of claim 11, wherein the cabinet further includes a third exterior panel on the fourth side of the cabinet, the third exterior panel including a third group of mounting holes, wherein the mounting bracket set can also mount the fourth side of the cabinet to the mounting pole in either the first or the second bracket configurations, and wherein the mounting bracket set attaches to the third group of mounting holes when the fourth side of the cabinet is mounted to the mounting pole.

13. A fiber distribution hub mountable on a mounting pole comprising:
a cabinet with a first side, a second side, a third side, and a fourth side, the cabinet including at least one door mounted on the first side and the cabinet including a first exterior panel on the second side;
an entrance location on the cabinet for a fiber optic feeder cable;
a fiber termination region positioned within the cabinet; and
a mounting bracket set including a first part and a second part, the first part of the mounting bracket set attachable to the cabinet, the second part of the mounting bracket set attachable to the mounting pole;
wherein the first part and the second part of the mounting bracket set can connect with each other in either a first bracket configuration or a second bracket configuration;
wherein the cabinet is mounted closer to the mounting pole when the mounting bracket set is in the first bracket configuration as compared to when the mounting bracket set is in the second bracket configuration;
wherein the first part of the mounting bracket set is slidingly received by the second part of the mounting bracket set when the first part and the second part are connected with each other; and
wherein the first part of the mounting bracket set includes a tab that is slidingly received by either a first or a second mounting slot of the second part of the mounting bracket set, wherein the tab is received by the first mounting slot when the mounting bracket set is in the first bracket configuration, and wherein the tab is received by the second mounting slot when the mounting bracket set is in the second bracket configuration.

14. The fiber distribution hub of claim 13, wherein the mounting bracket set further includes a third part for mounting the cabinet on the mounting pole, the third part being attachable to the first exterior panel of the cabinet at a first mounting flange or a second mounting flange, the third part being attachable to the mounting pole at a pole mounting flange, wherein the first mounting flange is attached to the first exterior panel when the mounting bracket set is in the first bracket configuration, and wherein the second mounting flange is attached to the first exterior panel when the mounting bracket set is in the second bracket configuration.

15. A fiber distribution hub mountable on a mounting pole comprising:
a cabinet with a first side, a second side, a third side, and a fourth side, the cabinet including at least one door mounted on the first side and the cabinet including a first exterior panel on the second side;
an entrance location on the cabinet for a fiber optic feeder cable;
a fiber termination region positioned within the cabinet; and
a mounting bracket set including a first part and a second part, the first part of the mounting bracket set attachable to the cabinet, the second part of the mounting bracket set attachable to the mounting pole;
wherein the first part and the second part of the mounting bracket set can connect with each other in either a first bracket configuration or a second bracket configuration;
wherein the cabinet is mounted closer to the mounting pole when the mounting bracket set is in the first bracket configuration as compared to when the mounting bracket set is in the second bracket configuration; and
wherein the mounting bracket set further includes a third part for mounting the cabinet on the mounting pole, the third part being attachable to the first exterior panel of the cabinet at a first mounting flange or a second mounting flange, the third part being attachable to the mounting pole at a pole mounting flange, wherein the first mounting flange is attached to the first exterior panel when the mounting bracket set is in the first bracket configuration, and wherein the second mounting flange is attached to the first exterior panel when the mounting bracket set is in the second bracket configuration.

16. A fiber distribution hub mountable on a mounting pole comprising:
a cabinet including at least one door;
an entrance location on the cabinet for a fiber optic feeder cable;
a fiber termination region positioned within the cabinet;
a first mounting structure including a first component and a second component, the first component of the first mounting structure attachable to the cabinet at a first location, the second part of the first mounting structure attachable to the mounting pole; and
a second mounting structure attachable to the cabinet at a second location by either a first mounting flange or a second mounting flange, the second location being vertically offset from the first location, the second mounting bracket attachable to the mounting pole at a pole mounting element;
wherein the first and the second mounting structures can be used to mount the cabinet on the mounting pole in a first mounting configuration with a first offset between the mounting pole and the cabinet or a second mounting configuration with a second offset between the mounting pole and the cabinet;
wherein the first mounting flange of the second mounting structure is attached to the cabinet when the cabinet is mounted to the mounting pole in the first mounting configuration;
wherein the second mounting flange of the second mounting structure is attached to the cabinet when the cabinet is mounted to the mounting pole in the second mounting configuration; and wherein the pole mounting element of the second mounting structure includes a saddle that engages the mounting pole.

17. The fiber distribution hub of claim 16, wherein mounting the cabinet in the first mounting configuration positions the cabinet farther from the mounting pole than mounting the cabinet in the second mounting configuration.

18. The fiber distribution hub of claim 16, wherein the first component includes a tab, wherein the second component includes first and second slots, wherein the second component includes first and second cradles, wherein the first cradle receives the mounting pole and the tab fits in the first slot when the cabinet is mounted to the mounting pole in the first mounting configuration, and wherein the second cradle receives the mounting pole and the tab fits in the second slot when the cabinet is mounted to the mounting pole in the second mounting configuration.

* * * * *